United States Patent
Ogawa et al.

(10) Patent No.: US 8,652,700 B2
(45) Date of Patent: Feb. 18, 2014

(54) FUEL CELL

(75) Inventors: Tetsuya Ogawa, Wako (JP); Ayatoshi Yokokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 13/256,546

(22) PCT Filed: Mar. 24, 2010

(86) PCT No.: PCT/JP2010/055778
§ 371 (c)(1),
(2), (4) Date: Sep. 14, 2011

(87) PCT Pub. No.: WO2010/110480
PCT Pub. Date: Sep. 30, 2010

(65) Prior Publication Data
US 2012/0003561 A1 Jan. 5, 2012

(30) Foreign Application Priority Data
Mar. 26, 2009 (JP) .................................. 2009-075303

(51) Int. Cl.
*H01M 2/38* (2006.01)
*H01M 2/40* (2006.01)
*H01M 8/24* (2006.01)

(52) U.S. Cl.
USPC ........... 429/457; 429/455; 429/456; 429/459; 429/460

(58) Field of Classification Search
None
See application file for complete search history.

(56) References Cited

U.S. PATENT DOCUMENTS

| | | | |
|---|---|---|---|
| 5,288,562 A | | 2/1994 | Taniguchi et al. |
| 6,344,290 B1 * | | 2/2002 | Bossel ............................ 429/456 |
| 2005/0019645 A1 * | | 1/2005 | Thomas et al. .................. 429/36 |
| 2007/0111068 A1 | | 5/2007 | Gudlavalleti et al. |

FOREIGN PATENT DOCUMENTS

| | | |
|---|---|---|
| JP | 11-45727 | 2/1999 |
| JP | 2005-85520 | 3/2005 |
| JP | 2006-120589 | 5/2006 |
| JP | 2007-123241 | 5/2007 |
| WO | 2007/089002 A2 | 8/2007 |
| WO | WO 2007142046 A1 * | 12/2007 |
| WO | 2009/093622 A1 | 7/2009 |

OTHER PUBLICATIONS

International Search Report for Application No. PCT/JP2010/055778, dated Jun. 25, 2010.
Japanese Office Action for Application No. 2009-075303, 5 pages, dated Sep. 3, 2013.

* cited by examiner

*Primary Examiner* — Ula C Ruddock
*Assistant Examiner* — Scott J Chmielecki
(74) *Attorney, Agent, or Firm* — Nelson Mullins Riley & Scarborough LLP; Anthony A. Laurentano

(57) ABSTRACT

A fuel cell comprises an electrolyte electrode assembly which includes an anode electrode, a cathode electrode, and an electrolyte; a separator which includes a sandwiching portion; a fuel gas channel which is formed at a first surface of the sandwiching portion, and is covered by the anode electrode; fuel gas outlets which are formed around the fuel gas channel; an oxygen-containing gas channel which is formed at a second surface of the sandwiching portion, and is covered by the cathode electrode; and oxygen-containing gas outlets which are formed around the oxygen-containing gas channel, in which the oxygen-containing gas outlets are formed at phases different from phases of the fuel gas outlets in a thickness direction of the separator.

35 Claims, 13 Drawing Sheets

⇨ OXYGEN-CONTAINING GAS
⇨ FUEL GAS

⇨ OXYGEN-CONTAINING GAS
⇨ FUEL GAS

⇨ OXYGEN-CONTAINING GAS
⇛ FUEL GAS

⇨ OXYGEN-CONTAINING GAS
⇨ FUEL GAS

⇨ OXYGEN-CONTAINING GAS
⇨ FUEL GAS

FUEL CELL

RELATED APPLICATIONS

This application is a 35 U.S.C. 371 national stage filing of International Application No. PCT/JP2010/055778, filed Mar. 24, 2010, which claims priority to Japanese Patent Application No. 2009-075303 filed on Mar. 26, 2009 in Japan. The contents of the aforementioned applications are hereby incorporated by reference.

TECHNICAL FIELD

The present invention relates to a fuel cell in which electrolyte electrode assemblies are stacked between separators, in which the electrolyte interposed between an anode electrode and a cathode electrode.

Priority is claimed on Japanese Patent Application No. 2009-075303, filed on Mar. 26, 2009, the content of which is incorporated herein by reference.

BACKGROUND ART

In general, in a solid electrolyte fuel cell (SOFC), an electrolyte electrode assembly (MEA) in which an anode electrode and a cathode electrode are disposed on both sides of an electrolyte is sandwiched between separators (bipolar plates). An oxide ion conductor such as stabilizing zirconium oxide is used as this electrolyte. The fuel cell is used as a fuel cell stack in which a predetermined number of electrolyte electrode assemblies and separators are stacked.

In recent years, a flat plate-shaped seal-less type solid electrolyte fuel cell has been developed. Such a seal-less type fuel cell has advantages such as the structure thereof is simplified and the load applied to the electrolyte electrode assembly is decreased, in comparison with a sealed type fuel cell.

Patent Citation 1 discloses a technique of providing flexibility to a connecting portion which connects a manifold portion of the separator and a portion where a power generating cell located. Since, the connecting portion has flexibility to an applied load, the load applied to the separator can be divided into the manifold portion and the portion where the power generating cell located, and thereby the load can be suitably applied to both the portions.

However, in the technique described in Patent Citation 1, since unused reactant gas (fuel gas and oxygen-containing gas) is uselessly discharged from a circumferential portion of the power generating cell, there is a problem that the reactant gas cannot be used efficiently.

Patent Citation 2 discloses a technique of providing a cover having gas outlets so as to cover the outer circumferential portion of a fuel electrode current collector, thus restricting discharge positions of surplus gas discharged from the outer circumferential portion. Accordingly, the useless discharge of gas from the outer circumferential portion of the fuel electrode current collector can be prevented.

However, the technique described in Patent Citation 2 has problems that the number of components and the manufacturing costs increases due to the providing of the cover which is a component separate from the separator. Since the thickness of the fuel cell increases, there is a problem that the fuel cell stack increases in size in the stacking direction.

In addition, Patent Citation 3 discloses a technique of forming a separator by pressing a thin circular plate formed of a nickel-chrome alloy. The separator described in Patent Citation 3 includes a first manifold of fuel gas, a first gas passage of fuel gas, a first orifice groove which is communicated with the first gas passage, and a first power collecting projection on an anode electrode side. In addition, on a cathode electrode side which is disposed on the opposite side of the anode electrode, the separator also includes a second manifold and a second gas passage of oxygen-containing gas opposite to the first power collecting projection, and includes a second power collecting projection opposite to the first manifold and the first gas passage. Additionally, a second orifice groove which is communicated with the second gas passage is provided at the side end portion of the separator.

CITATION LIST

Patent Citation 1: Japanese Unexamined Patent Application, First Publication No. 2006-120589
Patent Citation 2: Japanese Unexamined Patent Application, First Publication No. 2005-85520
Patent Citation 3: Japanese Unexamined Patent Application, First Publication No. H11-45727

DISCLOSURE OF THE INVENTION

Problems to be Solved by the Invention

However, in the technique described in Patent Citation 1 or Patent Citation 3, since the oxygen-containing gas discharged from the cathode electrode diffuses into the anode electrode, there is a problem with the anode electrode oxidizing and deteriorating. In addition, since the fuel gas discharged from the anode electrode diffuses to the cathode electrode, there is a problem with the cathode electrode reducing and deteriorating.

Particularly, in Patent Citation 3, the above-mentioned problems are prominent, because not only the oxygen-containing gas is discharged from the oxygen-containing gas orifice grooves but also discharged between the adjacent fuel gas orifice grooves, and not only the fuel gas is discharged from the fuel gas orifice grooves but also discharged between the adjacent oxygen-containing gas orifice grooves. In addition, since the gas passages of the fuel gas and the gas passages of the oxygen-containing gas alternate, and the power collecting projections of the fuel gas and the power collecting projections of the oxygen-containing gas alternate, the load in the stacking direction is not satisfactorily applied to the anode-electrode side and the cathode-electrode side of the separator. Thus, since the adhesiveness between the separator and the MEA is damaged, a satisfactory power collecting effect cannot be obtained. Thereby, the power generating efficiency is reduced.

An object of the invention is to provide a fuel cell in which the useless discharge of unused reactant gas (fuel gas and oxygen-containing gas) can be suppressed, and the diffusion of oxygen-containing gas to the anode electrode and the diffusion of fuel gas to the cathode electrode can be suppressed.

Means for Solving the Problems

The invention employs followings.

A fuel cell according to an aspect of the invention comprises an electrolyte electrode assembly which includes an anode electrode, a cathode electrode, and an electrolyte which is sandwiched between the anode electrode and the cathode electrode; a separator which includes a sandwiching portion that sandwiches the electrolyte electrode assembly; a fuel gas channel which is formed at a first surface of the sandwiching portion, and is covered by the anode electrode; fuel gas outlets which are formed around the fuel gas channel, and discharge a fuel gas inside the fuel gas channel to outside of the fuel gas channel; an oxygen-containing gas channel which is formed at a second surface of the sandwiching portion, and is covered by the cathode electrode; and oxygen-containing gas outlets which are formed around the oxygen-containing gas channel, and discharge an oxygen-containing gas inside the oxygen-containing gas channel to outside of the oxygen-containing gas channel, in which the oxygen-containing gas outlets are formed at phases different from phases of the fuel gas outlets in a circumferential direction of the sandwiching portion.

The oxygen-containing gas outlets and the fuel gas outlets are formed at different phases in a thickness direction of the separator.

A fuel gas inlet which is communicated with the fuel gas channel and an oxygen-containing gas inlet which is communicated with the oxygen-containing gas channel can be formed at the sandwiching portion.

A first circumferential protrusion which protrudes toward the fuel gas channel to contact with a circumferential portion of the anode electrode can be formed at the first surface of the sandwiching portion; a second circumferential protrusion which protrudes toward the oxygen-containing gas channel to contact with a circumferential portion of the cathode electrode can be formed at the second surface of the sandwiching portion; the fuel gas outlets can be formed at the first circumferential protrusion; and the oxygen-containing gas outlets can be formed at the second circumferential protrusion.

According to the fuel cell, the fuel gas supplied from the fuel gas inlet to the fuel gas channel is prevented from leaking to the outside by the first circumferential protrusion. Accordingly, it is possible to effectively use the fuel gas for power generating reaction. Thereby, the fuel utilization ratio can be improved satisfactorily. In addition, other gas such as an oxygen-containing gas or exhaust gas can be prevented from flowing into the anode electrode from the outside of the electrolyte electrode assembly by the first circumferential protrusion. Accordingly, it is possible to prevent a decrease in the power generating efficiency due to the oxidation of the anode electrode and to easily improve the durability of the separators or the electrolyte electrode assembly.

The oxygen-containing gas supplied from the oxygen-containing gas inlet to the oxygen-containing gas channel is prevented from leaking to the outside by the second circumferential protrusion. Accordingly, it is possible to effectively use the oxygen-containing gas for a power generating reaction. In addition, other gas such as fuel gas or exhaust gas can be prevented from flowing into the cathode electrode from the outside of the electrolyte electrode assembly by the second circumferential protrusion. Accordingly, it is possible to prevent a decrease in power generating efficiency due to the reduction of the cathode electrode and to easily improve the durability of the separators or the electrolyte electrode assembly.

It is possible to obtain a satisfactory power collecting effect using the first circumferential protrusion and the second circumferential protrusion. In addition, since the load in the thickness direction can be satisfactorily applied to the first circumferential protrusion and the second circumferential protrusion and thus the adhesiveness of the separator and the electrolyte electrode assembly increases, it is possible to obtain a more satisfactory power collecting effect. Thereby, the power generating efficiency can be improved.

Since the fuel gas outlets and the oxygen-containing gas outlets are arranged with different phases, other gas such as oxygen-containing gas or exhaust gas can be further prevented from flowing into the anode electrode from the outside of the electrolyte electrode assembly. Accordingly, it is possible to prevent a decrease in power generating efficiency due to oxidation of the anode electrode and to more easily improve the durability of the separators or the electrolyte electrode assembly.

Other gas such as fuel gas or exhaust gas can be further prevented from flowing into the cathode electrode from the outside of the electrolyte electrode assembly. Accordingly, it is possible to prevent a decrease in power generating efficiency due to the reduction of the cathode electrode and to more easily improve the durability of the separators or the electrolyte electrode assembly.

Since the discharged fuel gas (unused) and oxygen-containing gas (unused) are combusted around the sandwiching portion, the fuel cell (sandwiching portion) can be pre-heated. Thereby, an improvement in heat efficiency and a promotion in thermally self-sustained can be accomplished. Here, the thermally self-sustained means that the operating temperature of the fuel cell can be maintained only with self-generated heat and without adding heat from the outside.

A summation of opening sectional areas of the fuel gas outlets may be smaller than a summation of opening sectional areas of the oxygen-containing gas outlets.

A number of fuel gas outlets may be smaller than a number of oxygen-containing gas outlets.

In this case, generally, in a fuel cell operating at an air-fuel ratio (A/F)>1.0, a pressure difference and a pressure loss difference between the fuel gas and the oxygen-containing gas can be reduced. Accordingly, other gas such as oxygen-containing gas or exhaust gas can be further prevented from flowing into the anode electrode from the outside of the electrolyte electrode assembly, and other gas such as fuel gas or exhaust gas can be further prevented from flowing into the cathode electrode from the outside of the electrolyte electrode assembly. Accordingly, it is possible to easily improve the durability of the separators or the electrolyte electrode assembly.

The fuel gas outlets may be arranged in a radial pattern so as to be separated from each other at an equal angle interval in an in-plane direction of the separator from a center of the sandwiching portion.

The oxygen-containing gas outlets may be arranged in a radial pattern so as to be separated from each other at an equal angle interval in an in-plane direction of the separator from a center of the sandwiching portion.

In this case, the fuel gas widely diffuses to the entire anode electrode and the discharge of the fuel gas is not inclined to a particular fuel gas outlet. In addition, the oxygen-containing gas widely diffuses to the entire cathode electrode and the discharge of the fuel gas is not inclined to a particular oxygen-containing gas outlet. Accordingly, at the time of generating power, a generated power difference due to a concentration difference of the fuel gas or the oxygen-containing gas hardly occurs on the surface of the electrolyte electrode assembly and a temperature difference due to the generated power difference hardly occurs. Accordingly, it is possible to improve the durability of the electrolyte electrode assembly.

A summation of opening sectional areas of the fuel gas inlets may be smaller than a summation of opening sectional areas of the oxygen-containing gas inlets.

A number of fuel gas inlets may be smaller than a number of oxygen-containing gas inlets.

A volume of the fuel gas channel may be smaller than A volume of the oxygen-containing gas channel.

In this case, generally, in a fuel cell operating at an air-fuel ratio (A/F)>1.0, a pressure difference and a pressure loss difference between the fuel gas and the oxygen-containing gas can be reduced. Accordingly, other gas such as oxygen-containing gas or exhaust gas can be further prevented from flowing into the anode electrode from the outside of the electrolyte electrode assembly, and other gas such as fuel gas or exhaust gas can be further prevented from flowing into the cathode electrode from the outside of the electrolyte electrode assembly. Accordingly, it is possible to easily improve the durability of the separators or the electrolyte electrode assembly.

A plurality of first projections contacted with the anode electrode may be formed at the first surface of the sandwiching portion.

A plurality of second projections contacted with the cathode electrode may be formed at the second surface of the sandwiching portion.

In this case, it is possible to obtain a satisfactory power collecting effect due to the plurality of projections and to improve the flowability of the fuel gas and the fuel exhaust gas along the fuel gas channel formed between the projections. It is also possible to improve the flowability of the oxygen-containing gas and the exhaust oxygen-containing gas along the fuel gas channel formed between the projections.

A plurality of first projections contacted with the anode electrode can be formed at the first surface of the sandwiching portion; a plurality of second projections contacted with the cathode electrode can be formed at the second surface of the sandwiching portion; and a number of the first and second projections which are arranged at a same phase in the thickness direction of the separators may be greater than a number of the first and second projections at a difference phases in the thickness direction.

In this case, since the load in the thickness direction can be transmitted between the anode electrode side projections and the cathode electrode side projections, it is possible to improve the adhesiveness between the electrolyte electrode assembly and the separators and to efficiently collect the power generated from the electrolyte electrode assembly.

The fuel cell may further include a fuel gas bridge which is connected to the sandwiching portion, in which a fuel gas supply channel supplying the fuel gas to the fuel gas channel is formed; an oxygen-containing gas bridge which is connected to the sandwiching portion, in which an oxygen-containing gas supply channel supplying the oxygen-containing gas to the oxygen-containing gas channel is formed; a fuel gas supply portion which is connected to the fuel gas bridge, in which a fuel gas supply passage supplying the fuel gas to the fuel gas supply channel is formed in the thickness direction; and an oxygen-containing gas supply portion which is connected to the oxygen-containing gas bridge, in which an oxygen-containing gas supply passage supplying the oxygen-containing gas to the oxygen-containing gas supply channel is formed in the thickness direction.

In this case, the stacking load in the thickness direction is intercepted between the fuel gas supply portion and the sandwiching portion by the fuel gas bridge. The stacking load in the thickness direction is intercepted between the oxygen-containing gas supply portion and the sandwiching portion by the oxygen-containing gas bridge. Accordingly, it is possible to apply a desired load to the electrolyte electrode assembly. Therefore, with a simple and compact configuration, it is possible to apply a relatively-great load to the portions (the fuel gas supply portion and the oxygen-containing gas supply portion) requiring sealing ability and to apply a relatively-small load to the electrolyte electrode assembly to improve the adhesiveness with the sandwiching portion. Accordingly, it is possible to secure desired sealing ability in the fuel gas supply portion and the oxygen-containing gas supply portion, and to prevent the damage of the electrolyte electrode assembly as much as possible, thereby efficient generation and collection of power can be performed.

A summation of sectional area of the fuel gas supply channel may be smaller than a summation of sectional area of the oxygen-containing gas supply channel.

A summation of sectional area of the fuel gas supply passage may be smaller than a summation of sectional area of the oxygen-containing gas supply passage.

In this case, generally, in a fuel cell operating at an air-fuel ratio (A/F)>1.0, a pressure difference and a pressure loss difference between the fuel gas and the oxygen-containing gas are reduced. Accordingly, other gas such as oxygen-containing gas or exhaust gas can be further prevented from flowing into the anode electrode from the outside of the electrolyte electrode assembly, and other gas such as fuel gas or exhaust gas can be further prevented from flowing into the cathode electrode from the outside of the electrolyte electrode assembly. Accordingly, it is possible to easily improve the durability of the separators or the electrolyte electrode assembly.

The fuel gas supply portion may be formed at a center of the separator, and a plurality of the electrolyte electrode assemblies may be arranged concentrically or elliptically around the fuel gas supply portion.

In this case, since the fuel gas supply portion is formed at the center of the separator, the fuel gas supplied to the fuel cell can be satisfactorily heated by the heat generated from the power generation. Accordingly, the fuel cell can accomplish an improvement in heat efficiency and a promotion in thermally self-sustained. Here, the thermally self-sustained means that the operating temperature of the fuel cell can be maintained only by self-generated heat without adding heat from the outside.

Since the plural electrolyte electrode assemblies are arranged concentrically or elliptically around the fuel gas supply portion, the fuel gas can be uniformly distributed to the electrolyte electrode assemblies from the fuel gas supply portion, thereby the improvement and stabilization in power generation performance of the electrolyte electrode assemblies can be accomplished.

The electrolyte electrode assemblies arranged concentrically or elliptically in the fuel cells may be arranged at a same phase in a stacking direction of the fuel cells while a plurality of fuel cells are stacked.

In this case, since the load applied to the electrolyte electrode assemblies is not insufficient, it is possible to improve the adhesiveness between the electrolyte electrode assemblies and the separators. Thereby, the power generated from the electrolyte electrode assemblies can be collected efficiently.

A plurality of the sandwiching portions corresponding to a shape of the electrolyte electrode assemblies may be arranged, and the sandwiching portions may be separated from each other.

In this case, since the sandwiching portions have the shapes corresponding to the electrolyte electrode assemblies, it is possible to efficiently collect the power generated from the electrolyte electrode assemblies.

In addition, since the sandwiching portions are separated from each other, the load in the stacking direction can be applied independently to the adjacent electrolyte electrode assemblies. Accordingly, it is possible to absorb the load difference caused in the electrolyte electrode assemblies due to the size difference between the electrolyte electrode assemblies or the separators. Therefore, it is possible to prevent the strain caused in the whole separators and to apply uniform loads to the electrolyte electrode assemblies. Since the thermal strain of the electrolyte electrode assemblies is not transmitted to the adjacent electrolyte electrode assemblies, it is not necessary to provide a particular absorption mechanism with a particular size between the electrolyte electrode assemblies. Accordingly, it is possible to arrange the electrolyte electrode assemblies to be close to each other, thereby miniaturization of the whole fuel cell can be easily accomplished.

A plurality of the fuel gas bridges corresponding to the electrolyte electrode assemblies may be arranged, and the fuel gas bridges may be arranged in a radial pattern so as to be separated from each other at an equal angle interval outward from the fuel gas supply portion.

In this case, the fuel gas can be uniformly supplied to the electrolyte electrode assemblies from the fuel gas supply portion via the fuel gas bridges. Thereby, the improvement and stabilization in power generation performance of the electrolyte electrode assemblies can be accomplished.

A numbers of the sandwiching portions, the fuel gas bridges, and the oxygen-containing gas bridges may be correspond to a number of the electrolyte electrode assemblies respectively.

In this case, the fuel gas can be uniformly supplied to the electrolyte electrode assemblies from the fuel gas supply portion via the fuel gas bridges and the sandwiching portions, thereby accomplishing the improvement and stabilization in power generation performance of the electrolyte electrode assemblies.

The fuel cell may further include: a bridge which is connected to the sandwiching portion, in which a fuel gas supply channel supplying the fuel gas to the fuel gas channel and an oxygen-containing gas supply channel supplying the oxygen-containing gas to the oxygen-containing gas channel are formed; and a reactant gas supply portion which is connected to the bridge, in which a fuel gas supply passage supplying the fuel gas to the fuel gas supply channel and an oxygen-containing gas supply passage supplying the oxygen-containing gas to the oxygen-containing gas supply channel are formed in the thickness direction.

In this case, since the stacking load in the thickness direction is intercepted between the reactant gas supply portion and the sandwiching portion by the bridge, it is possible to apply a desired load to the electrolyte electrode assembly. Therefore, with a simple and compact configuration, it is possible to apply a relatively-great load to the portions (the fuel gas supply portion and the oxygen-containing gas supply portion) requiring sealing ability and to apply such a relatively-small load to improve the adhesiveness with the sandwiching portion to the electrolyte electrode assembly. Accordingly, it is possible to secure desired sealing ability in the reactant gas supply portion and to prevent the damage of the electrolyte electrode assembly as much as possible, thereby efficient generation and collection of power can be performed.

In addition, the fuel gas supply channel and the oxygen-containing gas supply channel are formed in the bridge. Accordingly, before the fuel gas and the oxygen-containing gas are supplied to the electrolyte electrode assembly, the temperature difference therebetween decreases, thereby the electrolyte electrode assembly can stably generate power.

The fuel gas supply passage and the oxygen-containing gas supply passage are formed in the reactant gas supply portion. Accordingly, before the fuel gas and the oxygen-containing gas are supplied to the electrolyte electrode assembly, the temperature difference therebetween decreases, thereby the electrolyte electrode assembly can stably generate power.

The fuel gas supply passage and the oxygen-containing gas supply passage requiring the sealing ability are arranged at the reactant gas supply portion. Accordingly, it is possible to secure desired sealing ability of the reactant gas supply portion and to suppress the damage of the electrolyte electrode assembly as much as possible, thereby the efficient power generation and power collection can be performed.

A summation of sectional area of the fuel gas supply channel may be smaller than a summation of sectional area of the oxygen-containing gas supply channel.

A summation of sectional area of the fuel gas supply passage may be smaller than a summation of sectional area of the oxygen-containing gas supply passage.

In this case, in a fuel cell operating at an air-fuel ratio (A/F)>1.0, a pressure difference and a pressure loss difference between the fuel gas and the oxygen-containing gas are reduced. Accordingly, other gas such as oxygen-containing gas or exhaust gas can be further prevented from flowing into the anode electrode from the outside of the electrolyte electrode assembly, and other gas such as fuel gas or exhaust gas can be further prevented from flowing into the cathode electrode from the outside of the electrolyte electrode assembly. Accordingly, it is possible to easily improve the durability of the separators or the electrolyte electrode assembly.

The reactant gas supply portion may be formed at a center of separator, and a plurality of the electrolyte electrode assemblies may be arranged concentrically or elliptically around the reactant gas supply portion.

In this case, since the reactant gas supply portion is disposed at the center of the separator, the fuel gas and the oxygen-containing gas before being supplied to the electrolyte electrode assembly can be satisfactorily heated by the heat generated from the power generation, thereby an improvement in heat efficiency and a promotion in thermally self-sustained can be accomplished.

Since the plural electrolyte electrode assemblies are arranged concentrically or elliptically around the reactant gas supply portion, the fuel gas and the oxygen-containing gas can be uniformly distributed to the electrolyte electrode assemblies, thereby the improvement and stabilization in power generation performance of the electrolyte electrode assemblies can be accomplished.

The electrolyte electrode assemblies arranged concentrically or elliptically in the fuel cells may be arranged at a same phase in a stacking direction of the fuel cells while a plurality of fuel cells are stacked.

In this case, since the load applied to the electrolyte electrode assemblies is not insufficient, it is possible to improve the adhesiveness between the electrolyte electrode assemblies and the separators. Thereby, the power generated from the electrolyte electrode assemblies can be collected efficiently.

A plurality of the sandwiching portions corresponding to a shape of the electrolyte electrode assemblies may be arranged, and the sandwiching portions may be separated from each other.

In this case, since the sandwiching portions have the shapes corresponding to the electrolyte electrode assemblies, it is possible to efficiently collect the power generated from the electrolyte electrode assemblies.

In addition, since the sandwiching portions are separated from each other, the load in the stacking direction can be applied independently to the adjacent electrolyte electrode assemblies. Accordingly, it is possible to absorb the load difference caused in the electrolyte electrode assemblies due to the size difference between the electrolyte electrode assemblies or the separators. Therefore, it is possible to prevent the strain caused in the whole separators and to apply uniform loads to the electrolyte electrode assemblies. Since the thermal strain of the electrolyte electrode assemblies is not transmitted to the adjacent electrolyte electrode assemblies, it is not necessary to provide a particular absorption mechanism with a particular size between the electrolyte electrode assemblies. Accordingly, it is possible to dispose the electrolyte electrode assemblies to be close to each other. Thereby, miniaturization of the entire fuel cell can be achieved.

A plurality of the bridge corresponding to the electrolyte electrode assemblies may be arranged, and the bridges may be arranged in a radial pattern so as to be separated from each other at an equal angle interval outward from the reactant gas supply portion.

In this case, the fuel gas and the oxygen-containing gas can be uniformly supplied to the electrolyte electrode assemblies from the reactant gas supply portion via the bridges. Thereby, the improvement and stabilization in power generation performance of the electrolyte electrode assemblies can be accomplished.

A numbers of the sandwiching portions and the bridges may be corresponding to a number of the electrolyte electrode assemblies.

In this case, the fuel gas and the oxygen-containing gas can be uniformly supplied to the electrolyte electrode assemblies from the reactant gas supply portion via the bridges and the sandwiching portions. Thereby, the improvement and stabilization in power generation performance of the electrolyte electrode assemblies can be accomplished.

The fuel gas supply passage may be formed at the center of the reactant gas supply portion, and a plurality of the oxygen-containing gas inlets may be arranged concentrically or elliptically around the fuel gas supply passage.

In this case, before the fuel gas and the oxygen-containing gas are supplied to the electrolyte electrode assembly, the temperature difference therebetween can decrease. Thereby, the electrolyte electrode assembly can stably generate power. In addition, since the summation of sectional area of the oxygen-containing gas supply passages is greater than the summation of sectional area of the fuel gas supply passage, it is possible to reduce the difference in pressure loss between the fuel gas and the oxygen-containing gas particularly in a fuel cell with a large A/F value. Accordingly, it is possible to satisfactorily improve the durability and the reliability of the fuel cell.

The oxygen-containing gas supply passages may be interposed between plural bridges.

In this case, it is possible to construct a fuel cell with a further simple and compact structure.

A number of the oxygen-containing gas supply passages may correspond to a number of the electrolyte electrode assemblies.

In this case, the oxygen-containing gas can be uniformly supplied to the electrolyte electrode assemblies from the oxygen-containing gas supply passage via the bridges and the sandwiching portions. Thereby, the improvement and stabilization in power generation performance of the electrolyte electrode assemblies can be accomplished.

The fuel gas supply portion or the reactant gas supply portion may be formed at a center of separator, and four electrolyte electrode assemblies may be arranged concentrically or elliptically around the fuel gas supply portion or the reactant gas supply portion.

In this case, since the fuel gas supply portion or the reactant gas supply portion is formed at the center of the separator, the fuel gas and the oxygen-containing gas supplied to the fuel cell can be satisfactorily heated by the heat generated from the power generation. Accordingly, the fuel cell can accomplish an improvement in heat efficiency and a promotion in thermally self-sustained. Here, the thermally self-sustained means that the operating temperature of the fuel cell can be maintained only by self-generated heat without adding heat from the outside.

In addition, four electrolyte electrode assemblies are arranged concentrically in the plane of the separator. Accordingly, it is possible to obtain a high occupancy ratio in a fuel cell structure in which two or more electrolyte electrode assemblies with the same shape and the same area are arranged concentrically in the plane of the separator. In addition, a stack volume for each power generation decreases, thereby the compactness of the whole fuel cell stack can be accomplished easily. On the other hand, since a stack surface area for each power generation decreases, it is possible to minimize the heat dissipation from the fuel cell stack, thereby the improvement in heat efficiency and the promotion in thermally self-sustained can be accomplished.

The fuel cell may be a solid oxide fuel cell.

In this case, in a solid oxide fuel cell which is a high-temperature fuel cell, the thermal strain of a sandwiching portion or an electrolyte electrode assembly due to heat stress, which is a problem in the related art, is not transmitted to the adjacent sandwiching portions or the adjacent electrolyte electrode assemblies. Accordingly, it is not necessary to provide an absorption mechanism with a particular size between the sandwiching portions or the electrolyte electrode assemblies, thereby easily achieve miniaturization of the fuel cell.

Effect of the Invention

According to the invention, the fuel gas supplied from the fuel gas inlet to the fuel gas channel is prevented from leaking to the outside by the first circumferential protrusion. Accordingly, it is possible to effectively use the fuel gas for power generating reaction; thereby a fuel utilization ratio can be satisfactorily improved. In addition, other gas such as oxygen-containing gas or exhaust gas can be prevented from flowing into the anode electrode from the outside of the electrolyte electrode assembly by the first circumferential protrusion. Accordingly, it is possible to prevent a decrease in power generating efficiency due to the oxidation of the anode electrode and to easily improve the durability of the separators or the electrolyte electrode assembly.

The oxygen-containing gas supplied from the oxygen-containing gas inlet to the oxygen-containing gas channel is prevented from leaking to the outside by the second circumferential protrusion. Accordingly, it is possible to effectively use the oxygen-containing gas for power generating reaction. In addition, other gas such as fuel gas or exhaust gas can be prevented from flowing into the cathode electrode from the outside of the electrolyte electrode assembly by the second circumferential protrusion. Accordingly, it is possible to prevent a decrease in power generating efficiency due to the reduction of the cathode electrode and to easily improve the durability of the separators or the electrolyte electrode assembly.

It is also possible to obtain a satisfactory power collecting effect using the first circumferential protrusion and the second circumferential protrusion. In addition, since a load in the stacking direction can be satisfactorily applied to the first circumferential protrusion and the second circumferential protrusion and thus the adhesiveness between the separators and the electrolyte electrode assembly increases, it is possible to obtain a more satisfactory power collecting effect. Thereby, the power generating efficiency can be improved.

Since the fuel gas outlets and the oxygen-containing gas outlets are arranged with different phases, other gas such as oxygen-containing gas or exhaust gas can be further prevented from flowing into the anode electrode from the outside of the electrolyte electrode assembly. Accordingly, it is possible to prevent a decrease in power generating efficiency due to the oxidation of the anode electrode and to more easily improve the durability of the separators or the electrolyte electrode assembly.

Other gas such as fuel gas or exhaust gas can be further prevented from flowing into the cathode electrode from the outside of the electrolyte electrode assembly. Accordingly, it is possible to prevent a decrease in power generating efficiency due to the reduction of the cathode electrode and to more easily improve the durability of the separators or the electrolyte electrode assembly.

Since the discharged fuel gas (unused) and oxygen-containing gas (unused) are combusted around the sandwiching portion, the fuel cell (sandwiching portion) can be pre-heated, thereby an improvement in heat efficiency and a promotion in thermally self-sustained can be accomplished. Here, the thermally self-sustained means that the operating temperature of the fuel cell can be maintained only by self-generated heat without adding heat from the outside.

DESCRIPTION OF EMBODIMENTS

Hereinafter, embodiments of the invention will be described with reference to the accompanying drawings. A fuel cell stack described below can be used in various applications for installation or vehicle-mounting or the like.

First Embodiment

Figure 2A:
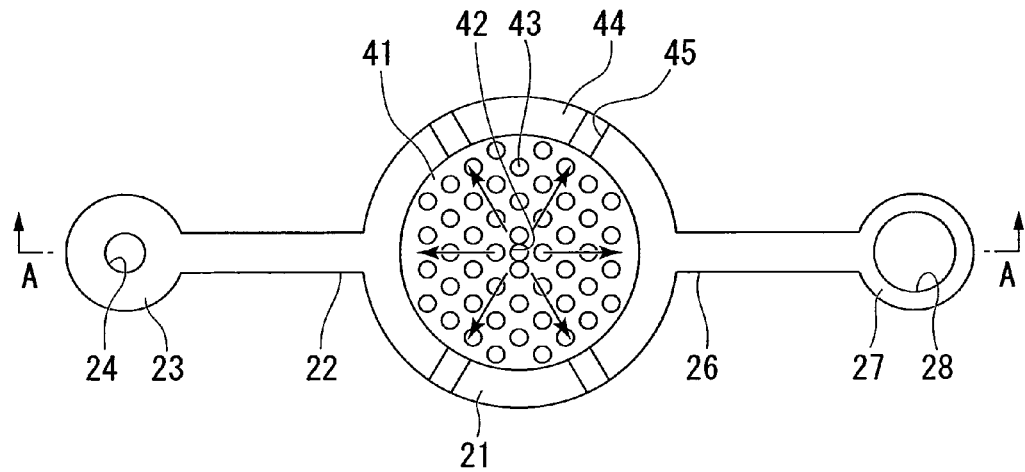
FIG. 2A is a plan view of a fuel cell according to the first embodiment of the invention.
Figure 2B:
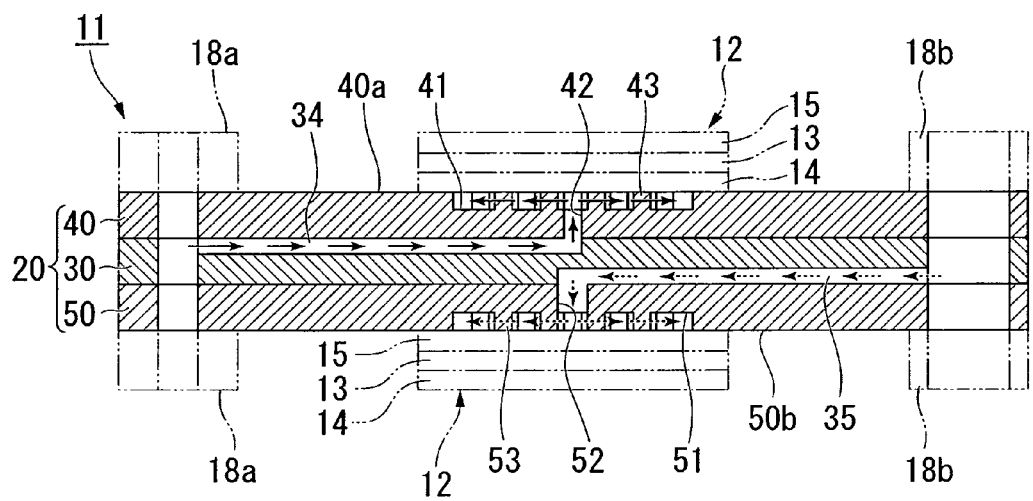
FIG. 2B is a side sectional view taken along line A-A of FIG. 2A.
Figure 2C:
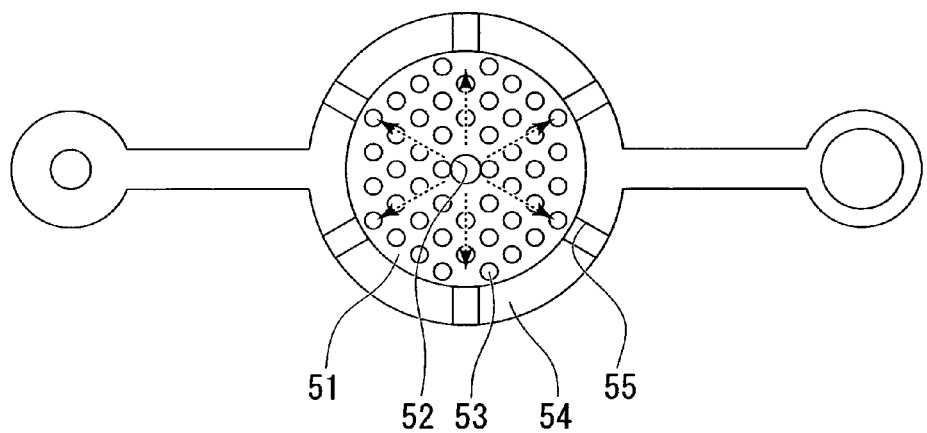
FIG. 2C is a bottom view of the fuel cell according to the first embodiment of the invention.

FIGS. 2A to 2C are views showing a fuel cell 11 according to a first embodiment of the invention, where FIG. 2A is a plan view, FIG. 2B is a side sectional view taken along line A-A of FIG. 2A (that is, a sectional view taken along line A-A of FIG. 3), and FIG. 2C is a bottom view thereof. As shown in FIG. 2B, the fuel cell 11 includes an electrolyte electrode assembly (electrolyte electrode assembly) 12 and a separator 20 disposed between the adjacent electrolyte electrode assemblies 12 and 12. The electrolyte electrode assemblies 12 and the separators 20 are alternately stacked to form a fuel cell stack. An actual separator 20 has a thin plate shape. However, the thickness of the separator 20 (and plates 30, 40, and 50 of the separator 20) is enlarged in the drawings for the purpose of easy understanding of structures such as gas passages formed in the separator 20.

As shown in FIG. 2B, the electrolyte electrode assembly 12 has a circular disk shape in which an anode electrode 14 and a cathode electrode 15 are disposed on both sides of an electrolyte (electrolyte plate) 13 formed of an oxide ion conductor such as stabilizing zirconium oxide. A barrier layer (not shown) for preventing inflow and leakage of oxygen-containing gas and fuel gas is formed on the side surface of the electrolyte electrode assembly 12.

[Separator]

As shown in FIG. 2A, the separator 20 includes a circular (cylindrical) sandwiching portion 21 which has the same large diameter as the electrolyte electrode assembly 12. The electrolyte electrode assembly 12 is sandwiched (interposed) between the sandwiching portions 21 of the adjacent separators 20. A pair of reactant gas bridges (cross-link portions) having a small-width liner shape extends from the sandwiching portion 21. As shown in FIG. 2A, the pair of reactant gas bridges, for example, includes a fuel gas bridge 22 and an oxygen-containing gas bridge 26. The reactant gas bridges 22 and 26 extend oppositely along a radial direction of the sandwiching portion 21. However, it is not only limited in this, more than two of the reactant gas bridges can be formed in a radial pattern from the sandwiching portion 21. In addition, the pair of reactant gas bridges may extend such as to form an angle (a sharp angle or an obtuse angle) between the pair of reactant gas bridges.

A fuel gas supply portion 23 and an oxygen-containing gas supply portion 27 (reactant gas supply portions 23 and 27) having a small-diameter circular shape are provided at the reactant gas bridges 22 and 26, respectively. A fuel gas supply passage 24 and an oxygen-containing gas supply passage 28 (reactant gas supply passages 24 and 28) are formed at the center of the reactant gas supply portions 23 and 27, respectively. The reactant gas supply passages 24 and 28 are formed in a stacking direction of the fuel cell 11. That is, the reactant gas supply passages 24 and 28 are formed in a thickness direction of the reactant gas supply portions 23 and 27, in which the thickness direction is intersects with a longitudinal direction of reactant gas bridges 22 and 26.

As shown in FIG. 2B, sealing members 18a and 18b are disposed between the adjacent reactant gas supply portions 23 and 27 of separators 20. The sealing members (gaskets) 18a and 18b are made of an insulating material (such as crustal component material, glass material, or compound material of clay and plastic) which has high resistance property to a reduction atmosphere of the fuel gas. The height of the sealing members 18a and 18b is equal to the height of the electrolyte electrode assembly 12.

Figure 3:
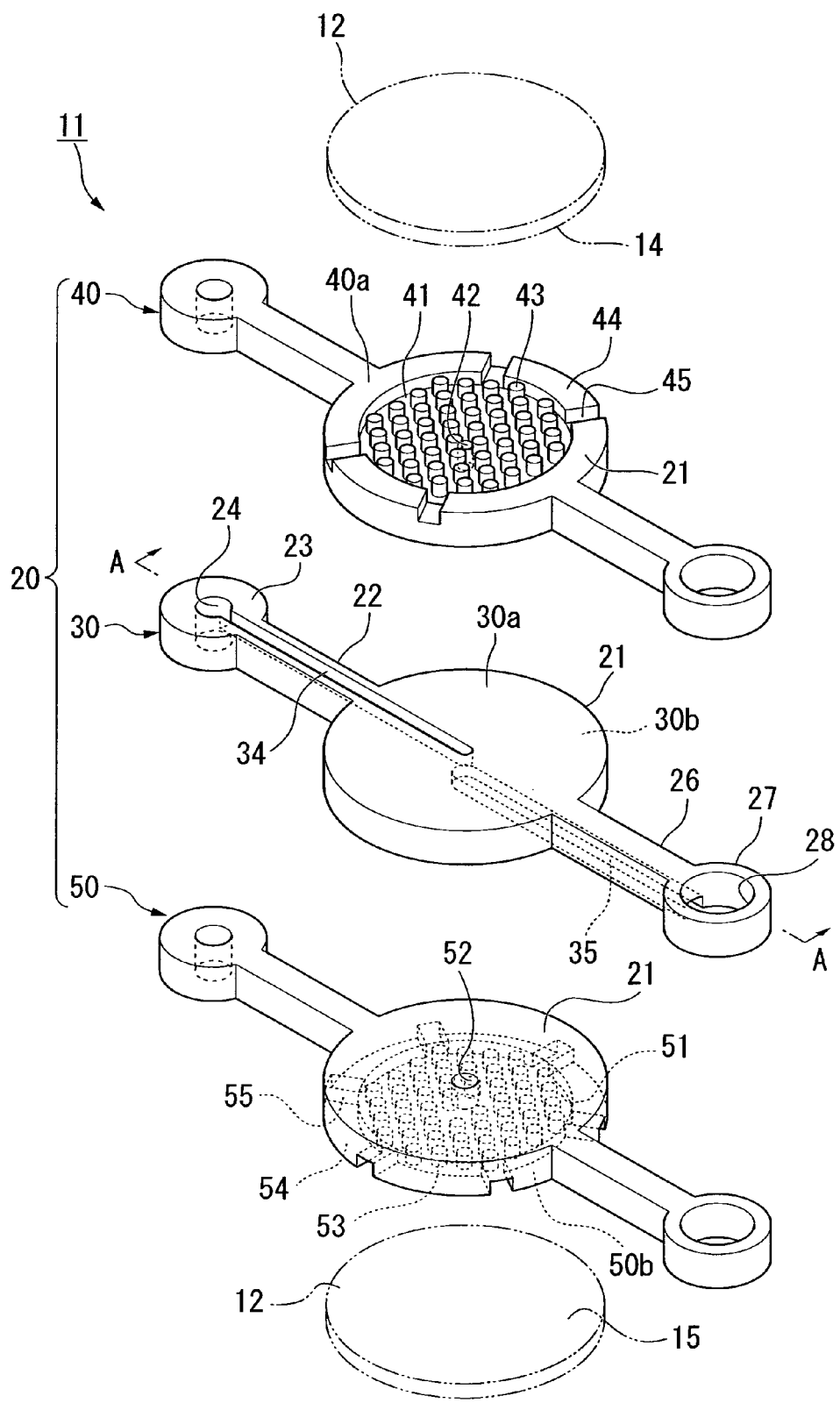
FIG. 3 is an exploded perspective view of the fuel cell according to the first embodiment of the invention.

FIG. 3 is an exploded perspective view of the fuel cell 11 according to the first embodiment. The separator 20 of the fuel cell 11 includes a first plate 40, a second plate 50, and a third plate 30 which are stacked. The plates 30, 40, and 50 are formed of metal plates of, for example, stainless alloy, and are bonded to each other by soldering, diffusion-bonding, laser welding, or the like. The plates 30, 40, and 50 include a fuel gas bridge 22, a fuel gas supply portion 23, a fuel gas supply passage 24, an oxygen-containing gas bridge 26, an oxygen-containing gas supply portion 27, and an oxygen-containing gas supply passage 28, in addition to the sandwiching portion 21 constituting the separator 20.

A fuel gas supply channel 34 is formed on the first surface 30a (front surface; that is, the surface facing the first plate 40) of the third plate 30. Specifically, the fuel gas supply channel 34 is formed by forming a groove to extend from the fuel gas supply passage 24 to the center of the sandwiching portion 21 through the fuel gas bridge 22 by the use of a method such as half etching or machining (hereinafter, referred to as "half etching or the like"). The first plate 40 is bonded to the first surface 30a of the third plate 30, whereby the upper opening of the fuel gas supply channel 34 is sealed.

An oxygen-containing gas supply channel 35 is formed on the second surface 30b (rear surface; that is, the surface facing the anode electrode 14 of the second plate 50) of the third plate 30. Specifically, the oxygen-containing gas supply channel 35 is formed by forming a groove to extend from the oxygen-containing gas supply passage 28 to the center of the sandwiching portion 21 through the oxygen-containing gas bridge 26 by the use of a method such as half etching or the like. The second plate 50 is bonded to the second surface 30b of the third plate 30, whereby the upper opening of the oxygen-containing gas supply channel 35 is sealed.

[Fuel Gas Passage]

As shown in FIGS. 2A and 2B, a fuel gas channel 41 is formed on a first surface 40a of the sandwiching portion 21 in the first plate 40 (front surface; that is, the surface facing the electrolyte electrode assembly 12). Specifically, the fuel gas channel 41 is formed by forming a cutout at the central of the sandwiching portion 21 by the use of the method of half etching or the like. A fuel gas inlet 42 communicating with the fuel gas supply channel 34 of the third plate 30 is formed in the vicinity of the center of the fuel gas channel 41. One fuel gas inlet 42 is shown in FIG. 2B. However, the invention is not limited to this embodiment. Plural fuel gas inlets 42 can be formed in the vicinity of the center of the fuel gas channel 41, in which the fuel gas inlets 42 are communicated with the fuel gas supply channel 34 of the third plate 30.

Plural projections 43 are formed inside the fuel gas channel 41 and a first circumferential protrusion 44 is formed around the fuel gas channel 41. By selectively forming the cutouts as the fuel gas channel 41, the projections 43 and the first circumferential protrusion 44 can be formed. The projections 43 and the first circumferential protrusion 44 are in close contact with the anode electrode 14 of the electrolyte electrode assembly 12. Accordingly, the projections 43 and the first circumferential protrusion 44 are working as a power collecting unit collecting power generated from the electrolyte electrode assembly 12. Since the sandwiching portion 21 has the same shape as the electrolyte electrode assembly 12, and the projections 43 and the first circumferential protrusion 44 are distributed at entire area of the sandwiching portion 21, it is possible to efficiently collect the power generated from the electrolyte electrode assembly 12.

Plural fuel gas outlets 45 are formed in the first circumferential protrusion 44 of the first plate 40. Specifically, the fuel gas outlets 45 are formed by forming grooves by the use of the method of half etching or the like so that the inside (the fuel gas channel 41) of the first circumferential protrusion 44 communicate with the outside of the first circumferential protrusion 44. The plural fuel gas outlets 45 are arranged in a radial pattern at the circumferential direction of the sandwiching portion 21 so as to be separated from each other. Accordingly, it is possible to uniformly discharge the fuel gas from the entire area of the fuel gas channel 41. In FIG. 2A, in the circumferential direction of the semi-circle of 0 to 180 degrees of the sandwiching portion 21 (semi-circumferential direction), two fuel gas outlets 45 are arranged at equal interval, respectively. That is, four fuel gas outlets 45 are arranged at a non-equal interval in the whole circumferential direction of the sandwiching portion 21. However, the plural fuel gas outlets 45 may be arranged at equal interval in the whole circumferential direction of the sandwiching portion 21. That is, the fuel gas outlets may be arranged in a radial pattern so as to be separated from each other at an equal angle interval in the circumferential direction of the sandwiching portion 21.

A seal-less type fuel cell in which the periphery portion of the anode electrode 14 of the electrolyte electrode assembly 12 is not sealed by the separator 20 has a problem that the fuel gas is wasted, because the unreacted fuel gas can be easily leaked to the outside of the fuel cell 11. A seal type fuel cell in which the periphery portion of the anode electrode 14 is sealed by the separator 20 has a problem that the structure of the fuel cell becomes complicated, because it is necessary to manage the pressing force of the separator 20 on the anode electrode 14. On the other hand, this embodiment of the invention employs a semi-seal type fuel cell which is an intermediate type between the seal-less type and the seal type. That is, in the present embodiment, the discharge of the fuel gas from the fuel gas outlets 45 is permitted while securing the adhesiveness between the first circumferential protrusion 44 of the first plate 40 and the anode electrode 14. Accordingly, it is possible to simplify the structure of the fuel cell while utilizing the fuel gas without any waste.

[Oxygen-Containing Gas Passage]

As shown in FIGS. 2B and 2C, an oxygen-containing gas channel 51 is formed on the second surface 50b of the sandwiching portion 21 in the second plate 50 (rear surface; that is, the surface facing the cathode electrode 15 of the electrolyte electrode assembly 12). Specifically, the oxygen-containing gas channel 51 is formed by forming a cutout at the central of the sandwiching portion 21 by the use of the method of half etching or the like. An oxygen-containing gas inlet 52 communicating with the oxygen-containing gas supply channel 35 of the third plate 30 is formed in the vicinity of the center of the oxygen-containing gas channel 51. One oxygen-containing gas inlet 52 is shown in FIG. 2B. However, the invention is not limited to this embodiment. Plural oxygen-containing gas inlets 52 can be formed in the vicinity of the center of the oxygen-containing gas channel 51, in which the oxygen-containing gas inlets 52 are communicated with the oxygen-containing gas supply channel 35 of the third plate 30.

Plural projections 53 are formed inside the oxygen-containing gas channel 51 and a second circumferential protrusion 54 is formed around the oxygen-containing gas channel 51. By selectively forming the cutout as the oxygen-containing gas channel 51, the projections 53 and the second circumferential protrusion 54 can be formed. The projections 53 and the second circumferential protrusion 54 are in close contact with the cathode electrode 15 of the electrolyte electrode assembly 12. Accordingly, the projections 53 and the second circumferential protrusion 54 are working as a power collecting unit collecting power generated from the electrolyte electrode assembly 12. Since the sandwiching portion 21 has the same shape as the electrolyte electrode assembly 12, and the projections 53 and the second circumferential protrusion 54 are distributed at the entire area of the sandwiching portion 21, it is possible to efficiently collect the power generated from the electrolyte electrode assembly 12.

Plural oxygen-containing gas outlets 55 are formed in the second circumferential protrusion 54 of the second plate 50. Specifically, the oxygen-containing gas outlets 55 are formed by forming grooves by the use of the method of half etching or the like so that the inside (the oxygen-containing gas channel 51) of the second circumferential protrusion 54 communicate with the outside of the second circumferential protrusion 54. As shown in FIG. 2C, the plural oxygen-containing gas outlets 55 are arranged in a radial pattern in the circumferential direction of the sandwiching portion 21 so as to be separated from each other at an equal angle interval. Accordingly, it is possible to uniformly discharge the oxygen-containing gas from the entire area of the oxygen-containing gas channel 51. The plural oxygen-containing gas outlets 55 may be arranged at a non-equal interval in the circumferential direction of the full circle of the sandwiching portion 21, like the fuel gas outlets 45.

Figure 4:
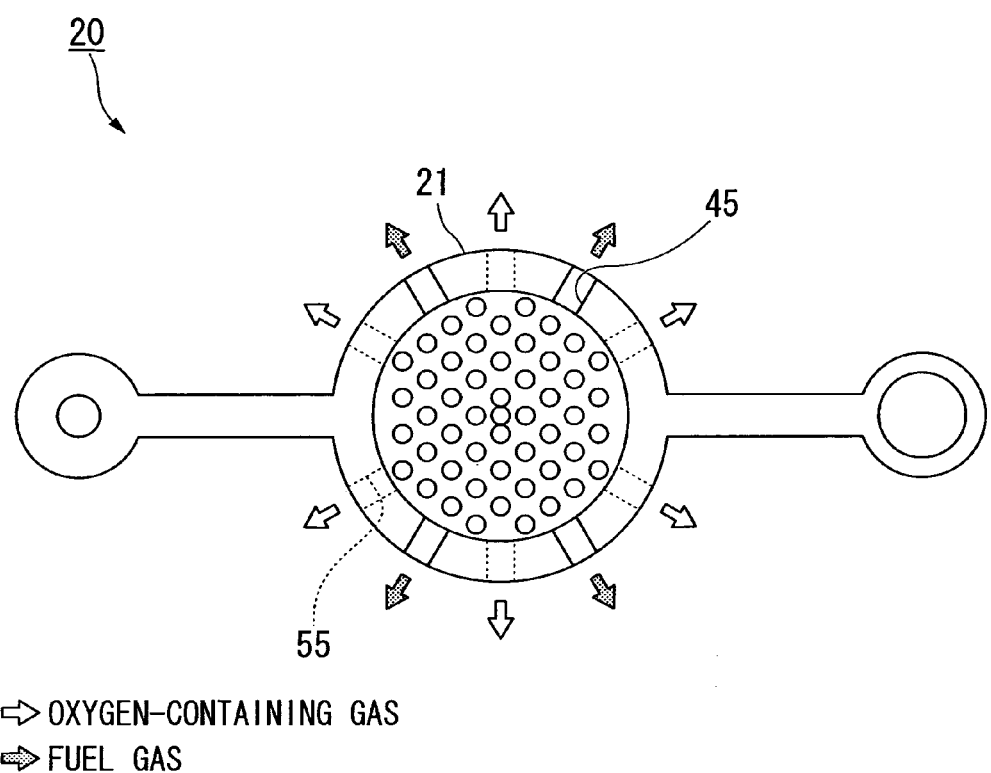
FIG. 4 is a plan view of a separator according to the first embodiment of the invention.

FIG. 4 is a plan view of the separator 20. The number (four in FIG. 4) of fuel gas outlets 45 is set to be smaller than the number (six in FIG. 4) of oxygen-containing gas outlets 55. The summation of the opening sectional area of the plural fuel gas outlets 45 is set to be smaller than the summation of the opening sectional area of the plural oxygen-containing gas outlets 55.

The fuel gas outlets 45 and the oxygen-containing gas outlets 55 are disposed at different positions (with a different phase) in the circumferential direction of the sandwiching portion 21. In FIG. 4, the fuel gas outlet 45 is located at an intermediate position (a position with an intermediate phase) between the adjacent oxygen-containing gas outlets 55.

[Fuel Cell Stack]

Figure 1:
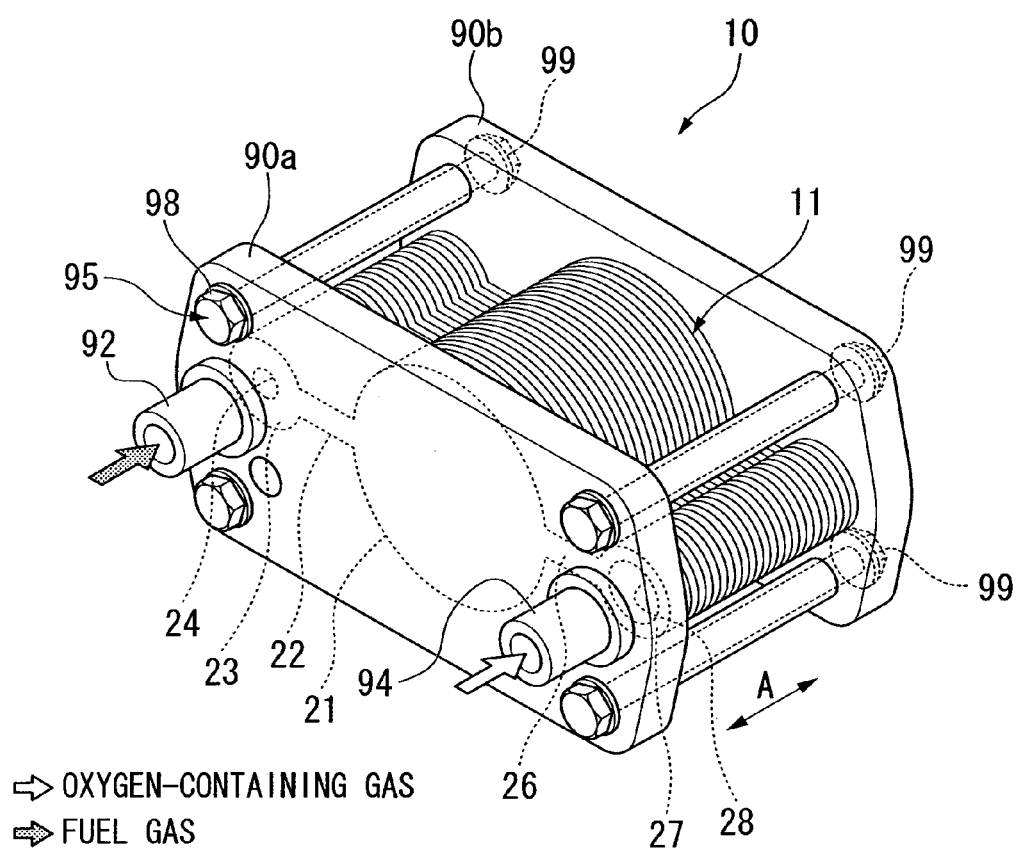
FIG. 1 is a perspective view schematically illustrating a fuel cell stack according to a first embodiment of the invention.

FIG. 1 is a perspective view schematically illustrating a fuel cell stack 10. The plural fuel cells 11 are stacked in the direction of arrow A to form the fuel cell stack 10. End plates 90a and 90b are disposed on both ends of the fuel cell stack 10 in the stacking direction, respectively. The end plates 90a and 90b are connected by fastening member 95 having bolt 98 and nut 99. The bolt 98 is inserted into through-holes of the end plates 90a and 90b from the outside of one end plate 90a, and the nut 99 is screwed to the bolt 98 at the outside of the other end plate 90b. The fuel cell stack 10 is sandwiched between the end plates 90a and 90b by the fastening member 95, whereby a load in the stacking direction (hereinafter, referred to as "stacking load") is applied to the plural fuel cells 11. The end plates 90a and 90b work as output electrodes of power generated from the fuel cell stack 10. Accordingly, the end plates 90a and 90b are electrically isolated from the fastening member 95.

A first pipe 92 supplying the fuel gas to the fuel gas supply passage 24 of the fuel cell stack 10 and a second pipe 94 supplying the oxygen-containing gas to the oxygen-containing gas supply passage 28 of the fuel cell stack 10 are disposed at, for example the end plate 90a, one of the end plates 90a and 90b. The discharge gas from the fuel cell stack 10 is discharged radially between the end plates 90a and 90b.

As described above, the reactant gas supply portions 23 and 27 are connected to the sandwiching portion 21 by the reactant gas bridges 22 and 26 with a small width according to the fuel cell 11 of this embodiment. Accordingly, the stacking loads applied to the reactant gas supply portions 23 and 27 and the sandwiching portion 21 can be different from each other. That is, a large stacking load for securing the sealing property with the sealing member can be applied to the reactant gas supply portions 23 and 27, and such a relatively small stacking load to increase the adhesiveness to the electrolyte electrode assembly can be applied to the sandwiching portion 21. Accordingly, it is possible to prevent the damage of the electrolyte electrode assembly. The stacking load can be adjusted by adjusting the fastening force of the fastening member 95 and disposing the fastening member 95 around the reactant gas supply portions 23 and 27 and the sandwiching portion 21. Since the first circumferential protrusion and the second circumferential protrusion are disposed in the sandwiching portion 21, the adhesiveness of the separator and the electrolyte electrode assembly can increase, and the stacking load can be transmitted satisfactorily. The projections 43 protruding toward the anode electrode 14 and the projections 53 protruding toward the cathode electrode 15 are formed at the same positions in the stacking direction (thickness direction) of the separators 20. Accordingly, the stacking load can be transmitted more satisfactorily, and the adhesiveness of the electrolyte electrode assembly and the separator can be improved, and the power generated from the electrolyte electrode assembly can be efficiently collected.

[Operation]

Operations of the fuel cell having the above-mentioned configuration will be described below.

First, the fuel gas (for example, hydrogen gas) is supplied to the first pipe 92 and the oxygen-containing gas (for example, air) is supplied to the second pipe 94 while heating the fuel cell stack 10 shown in FIG. 1 at a predetermined temperature.

The fuel gas supplied from the first pipe 92 shown in FIG. 1 flows through the fuel gas supply passage 24 shown in FIG. 2A and flows into the fuel gas supply channels 34 of the plural stacked separators 20. The fuel gas is supplied to the vicinity of the center of the sandwiching portion 21 through the fuel gas supply channel 34 shown in FIG. 2B, and flows into the fuel gas channel 41 through the fuel gas inlet 42. Since the fuel gas channel 41 faces the anode electrode 14 of the electrolyte electrode assembly 12, the fuel gas flows radially to the periphery portion from the center of the anode electrode 14. Since the first circumferential protrusion 44 is in close contact with the periphery portion of the anode electrode 14, the leakage of the fuel gas to outside is prevented. Accordingly, it is possible to effectively utilize the fuel gas for reaction of power generation. Thereby, the fuel utilization ratio can be improved satisfactorily.

The oxygen-containing gas (for example, air) supplied from the second pipe 94 shown in FIG. 1 flows through the oxygen-containing gas supply passage 28 shown in FIG. 2A and flows into the oxygen-containing gas supply channel 35 of the plural stacked separators 20. The oxygen-containing gas is supplied to the vicinity of the center of the sandwiching portion 21 through the oxygen-containing gas supply channel 35 shown in FIG. 2B, and flows into the oxygen-containing gas channel 51 through the oxygen-containing gas inlet 52. Since the oxygen-containing gas channel 51 faces the cathode electrode 15 of the electrolyte electrode assembly 12, the oxygen-containing gas flows radially to the periphery portion from the center of the cathode electrode 15. Since the second circumferential protrusion 54 is in close contact with the periphery portion of the cathode electrode 15, the leakage of the oxygen-containing gas to outside is prevented. Accordingly, it is possible to effectively utilize the oxygen-containing gas for the power generation reaction.

Oxide ions generated from the oxygen-containing gas by the cathode electrode 15 moves to the anode electrode 14 through the electrolyte 13 and cause a chemical reaction with the fuel gas to generate power. The fuel cell can accomplish the thermally self-sustained with the continuous reaction. The thermally self-sustained means that the operating temperature of the fuel cell is maintained only by the self-generated heat without any application of heat from the outside.

The oxygen-containing gas used for generating the power is discharged to the outside of the cathode electrode 15 from the oxygen-containing gas outlets 55 formed in the periphery portion of the sandwiching portion 21. When the oxygen-containing gas flows into the anode electrode 14, the anode electrode 14 is oxidized, thereby the power generation efficiency is reduced and the fuel cell is deteriorated.

On the other hand, in this embodiment, it is possible to prevent other gas such as oxygen-containing gas or exhaust gas from flowing into the anode electrode 14 from the outside of the electrolyte electrode assembly 12 by the first circumferential protrusion 44. Accordingly, it is possible to prevent the decrease in power generation efficiency due to the oxidization of the anode electrode 14 and to easily improve the durability of the separator 20 and the electrolyte electrode assembly 12.

The fuel gas used for generating the power is discharged to the outside of the anode electrode 14 from the fuel gas outlets 45 formed in the periphery portion of the sandwiching portion 21. When the fuel gas flows into the cathode electrode 15, the cathode electrode 15 is reduced, thereby the power generation efficiency is reduced and the fuel cell is deteriorated.

On the other hand, in this embodiment, it is possible to prevent other gas such as fuel gas or exhaust gas from flowing into the cathode electrode 15 from the outside of the electrolyte electrode assembly 12 by the second circumferential protrusion 54. Accordingly, it is possible to prevent the decrease in power generation efficiency due to the reduction of the cathode electrode 15 and to easily improve the durability of the separator 20 and the electrolyte electrode assembly 12.

In this embodiment, since the fuel gas outlets 45 and the oxygen-containing gas outlets 55 are arranged with different phases, it is possible to further prevent other gas such as oxygen-containing gas or exhaust gas from flowing into the fuel gas outlets 45 from the outside of the electrolyte electrode assembly 12 and flowing into the anode electrode 14, in comparison with the case where both outlets 45 and 55 are arranged with the same phase. Accordingly, it is possible to prevent the decrease in power generation efficiency due to the oxidization of the anode electrode 14 and to easily improve the durability of the separator 20 and the electrolyte electrode assembly 12.

Other gas such as fuel gas or exhaust gas can be further prevented from flowing into the oxygen-containing gas outlets 55 and flowing into the cathode electrode 15 from the outside of the electrolyte electrode assembly 12. Accordingly, it is possible to prevent a decrease in power generating efficiency due to the reduction of the cathode electrode 15 and to more easily improve the durability of the separator 20 or the electrolyte electrode assembly 12.

Since the discharged fuel gas (unused) and oxygen-containing gas (unused) are combusted around the sandwiching portion 21, the fuel cell 11 (the sandwiching portion 21) can be pre-heated, thereby the heat efficiency can be improved and the thermally self-sustained can be promoted. Here, the thermally self-sustained means that the operating temperature of the fuel cell can be maintained only by self-generated heat without adding heat from the outside.

Generally, in the fuel cell, the oxygen-containing gas and the fuel gas are consumed at a constant ratio (air-fuel ratio A/F>1.0). However, when the A/F value is excessively small, the fuel gas is wasted. When the A/F value is excessively large, the temperature of the fuel cell becomes lower.

In this embodiment, the passage sectional area of the fuel gas is smaller than the passage sectional area of the oxygen-containing gas. Specifically, the ratio of the passage sectional area of the oxygen-containing gas and the passage sectional area of the fuel gas is almost equal to the A/F value of the fuel cell. That is, the second pipe 94 and the first pipe 92, the oxygen-containing gas supply passage 28 and the fuel gas supply passage 24, the oxygen-containing gas supply channel 35 and the fuel gas supply channel 34, the oxygen-containing gas inlet 52 and the fuel gas inlet 42, the oxygen-containing gas channel 51 and the fuel gas channel 41, and the oxygen-containing gas outlets 55 and the fuel gas outlets 45 are formed so as those ratio of the passage sectional area to be almost equal to the A/F value of the fuel cell. Accordingly, it is possible to supply the oxygen-containing gas and the fuel gas in just proportion (not too much and not too less), whereby the waste of the fuel gas can be prevented, and the lowering in temperature of the fuel cell can also be prevented. In the fuel cell 11 generally operating at A/F>1.0, a pressure difference and a pressure loss difference between the fuel gas and the oxygen-containing gas are reduced. Accordingly, other gas such as oxygen-containing gas or exhaust gas can be further prevented from flowing into the anode electrode 14 from the outside of the electrolyte electrode assembly 12, and other gas such as fuel gas or exhaust gas can be further prevented from flowing into the cathode electrode 15 from the outside of the electrolyte electrode assembly 12. Accordingly, it is possible to easily improve the durability of the separators 20 and the electrolyte electrode assembly 12.

In this embodiment, the summation of opening sectional area of the fuel gas outlets 45 is set to be smaller than the summation of opening sectional area of the oxygen-containing gas outlets 55.

Preferably, the number of fuel gas outlets 45 is set to be smaller than the number of oxygen-containing gas outlets 55.

The summation of opening sectional area of the fuel gas inlet 42 is set to be smaller than the summation of opening sectional area of the oxygen-containing gas inlet 52.

The number of fuel gas inlets 42 is set to be smaller than the number of oxygen-containing gas inlets 52.

The volume of the fuel gas channel 41 is set to be smaller than the volume of the oxygen-containing gas channel 51.

The summation of sectional area of the fuel gas supply channel 34 is set to be smaller than the summation of sectional area of the oxygen-containing gas supply channel 35.

The summation of sectional area of the fuel gas supply passage 24 is set to be smaller than the summation of sectional area of the oxygen-containing gas supply passage 28.

Accordingly, in the fuel cell 11 generally operating at A/F>1.0, a pressure difference and a pressure loss difference between the fuel gas and the oxygen-containing gas are reduced. Accordingly, other gas such as oxygen-containing gas or exhaust gas can be further prevented from flowing into the anode electrode 14 from the outside of the electrolyte electrode assembly 12, and other gas such as fuel gas or exhaust gas can be further prevented from flowing into the cathode electrode 15 from the outside of the electrolyte electrode assembly 12. Accordingly, it is possible to easily improve the durability of the separators 20 and the electrolyte electrode assembly 12.

In this embodiment, the fuel gas outlets 45 are separated from each other and arranged in a radial pattern in the in-plane direction of the separator 20 from the center of the sandwiching portion 21.

The oxygen-containing gas outlets 55 are separated from each other at an equal angle interval and are arranged in a radial pattern in the in-plane direction of the separator 20 from the center of the sandwiching portion 21.

Accordingly, the fuel gas widely diffuses to the entire area of the anode electrode 14 and the discharge of the used fuel gas is not inclined to a particular fuel gas outlet 45. In addition, the oxygen-containing gas widely diffuses to the entire area of the cathode electrode 15 and the discharge of the used oxygen-containing gas is not inclined to a particular oxygen-containing gas outlet 55. Accordingly, at the time of generating power, a generated power difference due to a concentration difference of the fuel gas or the oxygen-containing gas hardly occurs on the surface of the electrolyte electrode assembly 12, in addition, a temperature difference due to the generated power difference hardly occurs. Accordingly, it is possible to improve the durability of the electrolyte electrode assembly 12.

In this embodiment, the plural projections 43 protruding toward the fuel gas channel 41 to come into contact with the anode electrode 14 are provided at the sandwiching portion 21. In addition, the plural projections 53 protruding toward the oxygen-containing gas channel 51 to come into contact with the cathode electrode 15 are provided at the sandwiching portion 21.

Accordingly, it is possible to obtain an excellent power collecting effect due to the plural projections 43 and 53 and to improve the flowability of the fuel gas and the exhaust fuel gas along the fuel gas channel 41 formed between the projections 43. It is also possible to improve the flowability of the oxygen-containing gas and the exhaust oxygen-containing gas along the fuel gas channel 51 formed between the projections 53.

In this embodiment, the plural projections 43 protruding toward the fuel gas channel 41 to come into contact with the anode electrode 14 and plural projections 53 protruding toward the oxygen-containing gas channel 51 to come into contact with the cathode electrode 15 are provided at the sandwiching portion 21. In addition, the number of projections 43 protruding toward the anode electrode 14 and the projections 53 protruding toward the cathode electrode 15, which are arranged with the same phase in the stacking direction (thickness direction) of the separators 20, are greater than those with phases other than the same phase. That is, the number of projections located at the same positions as viewed in the stacking direction of the separators 20 is greater than the number of projections located at different positions.

Accordingly, since the load in the stacking direction can be transmitted between the projections 43 protruding toward the anode electrode 14 and the projections 53 protruding toward the cathode electrode 15, it is possible to improve the adhesiveness between the electrolyte electrode assembly 12 and the separators 20, and to efficiently collect the power generated from the electrolyte electrode assembly 12.

In the fuel cell 11 according to this embodiment, the sandwiching portion 12 is connected to the fuel gas supply portion 23 by the fuel gas bridge 22, and the sandwiching portion 21 is connected to the oxygen-containing gas supply portion 27 by the oxygen-containing gas bridge 26.

Accordingly, the stacking load (clamp load) in the stacking direction is intercepted between the fuel gas supply portion 23 and the sandwiching portion 21 by the fuel gas bridge 22. The stacking load in the stacking direction is intercepted between the oxygen-containing gas supply portion 27 and the sandwiching portion 21 by the oxygen-containing gas bridge 26. Accordingly, it is possible to apply a desired load to the electrolyte electrode assembly 12. Therefore, with a simple and compact configuration, it is possible to apply a relatively-great load to the portions requiring sealing ability (the fuel gas supply portion 23 and the oxygen-containing gas supply portion 27), while a relatively-small load to improve the adhesiveness with the sandwiching portion 21 is applied to the electrolyte electrode assembly 12. Accordingly, it is possible to secure (guarantee) predetermined sealing ability at the fuel gas supply portion 23 and the oxygen-containing gas supply portion 27, and to prevent the damage of the electrolyte electrode assembly 12 as much as possible, thereby it is possible to perform efficient generation and collection of power.

Second Embodiment

Figure 6:
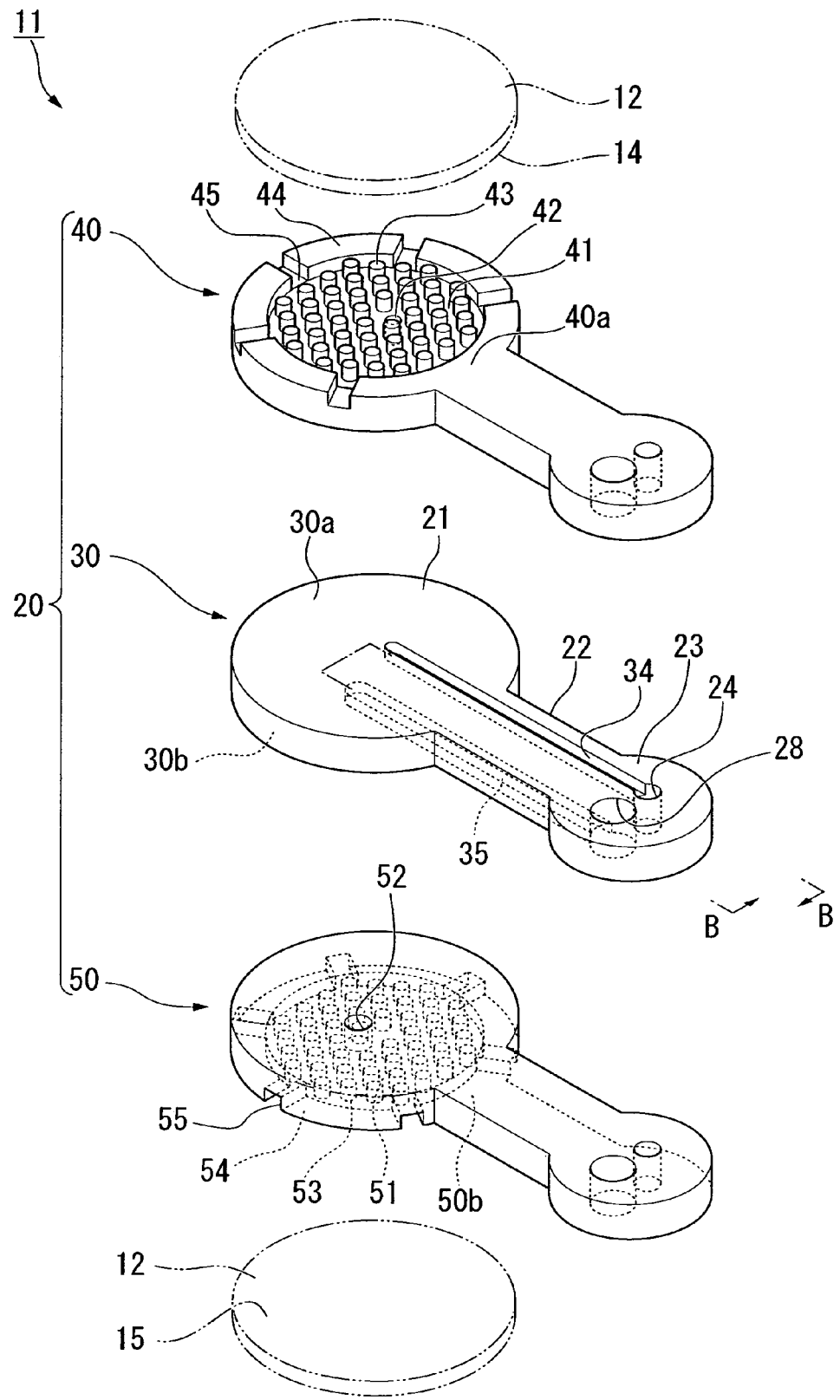
FIG. 6 is an exploded perspective view of a fuel cell according to the second embodiment of the invention.

A fuel cell according to a second embodiment of the invention will be described below. In the first embodiment shown in FIG. 3, the fuel gas supply passage 24 is formed in the fuel gas supply portion 23 and the oxygen-containing gas supply passage 28 is formed in the oxygen-containing gas supply portion 27, respectively. However, the difference in the second embodiment shown in FIG. 6 is the fuel gas supply passage 24 and the oxygen-containing gas supply passage 28 are formed in one reactant gas supply portion 23. The same elements as described in the first embodiment will not be described in detail.

FIG. 6 is an exploded perspective view of the fuel cell 11 according to the second embodiment of the invention. The sectional view taken along line B-B of FIG. 6 is almost equal to FIG. 2B. As shown FIG. 6, in the separator 20 of the fuel cell 11, a single reactant gas bridge 22 extends from the sandwiching portion 21 in the radial direction. A single reactant gas supply portion 23 is provided at a distal end of the reactant gas bridge 22. The fuel gas supply passage 24 and the oxygen-containing gas supply passage 28 are formed in parallel in the reactant gas supply portion 23. As shown in FIG. 2B, the sealing member 18*a* is disposed between the reactant gas supply portions 23 of the adjacent separators 20.

As shown in FIG. 6, the separator 20 includes the first plate 40, the second plate 50, and the third plate 30 which are stacked. The fuel gas supply channel 34 is formed in the first surface 30*a* (front surface; that is, the surface facing the first plate 40) of the third plate 30 from the fuel gas supply passage 24 to the center of the sandwiching portion 21 through the reactant gas bridge 22. The oxygen-containing gas supply channel 35 is formed in the second surface 30*b* (rear surface; that is, the surface facing the second plate 50) of the third plate 30 from the oxygen-containing gas supply passage 28 to the center of the sandwiching portion 21 through the reactant gas bridge 22.

The fuel gas channel 41 is formed on the surface 40*a* of the sandwiching portion 21 in the first plate 40 (front surface; that is, the surface facing the anode electrode 14 of the electrolyte electrode assembly 12). The fuel gas inlet 42 communicating with the fuel gas supply channel 34 of the third plate 30 is formed in the vicinity of the center of the fuel gas channel 41. Plural projections 43 are formed inside the fuel gas channel 41, and the first circumferential protrusion 44 is formed around the fuel gas channel 41. Plural fuel gas outlets 45 are formed in a radial pattern at the circumferential direction of the first circumferential protrusion 44 so as to be separated from each other. As in the first embodiment, the fuel gas outlets 45 can be arranged at equal intervals or non-equal intervals at the circumferential direction of the first circumferential protrusion 44.

The oxygen-containing gas channel 51 is formed on the second surface 50*b* of the sandwiching portion 21 in the second plate 50 (rear surface; that is, the surface facing the cathode electrode 15 of the electrolyte electrode assembly 12). The oxygen-containing gas inlet 52 communicating with the oxygen-containing gas supply channel 35 of the third plate 30 is formed in the vicinity of the center of the oxygen-containing gas channel 51. Plural projections 53 are formed inside the oxygen-containing gas channel 51, and the second circumferential protrusion 54 is formed around the oxygen-containing gas channel 51. Plural oxygen-containing gas outlets 55 are formed in a radial pattern so as to be separated from each other at an equal angle interval in the circumferential direction of the second circumferential protrusion 54. The oxygen-containing gas outlets 55 can be arranged at equal interval or non-equal interval in the circumferential direction of the second circumferential protrusion 54.

Figure 7:
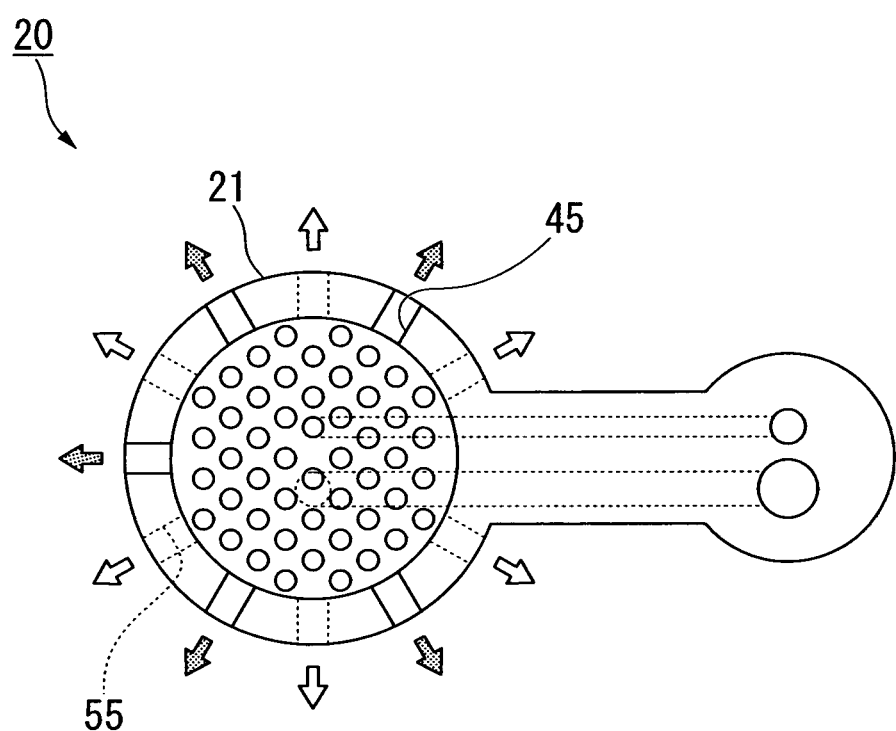
FIG. 7 is a plan view of a separator according to the second embodiment of the invention.

FIG. 7 is a plan view of the separator 20. The fuel gas outlets 45 and the oxygen-containing gas outlets 55 are located at different positions (with different phases) in the circumferential direction of the second circumferential protrusion 54, that is in the circumferential direction of the sandwiching portion 21. The fuel gas supply channel 34 and the oxygen-containing gas supply channel 35 are placed at different positions in the plan intersects with the stacking direction (thickness direction). In addition, the fuel gas inlet 42 and the oxygen-containing gas inlet 52 can be distributed symmetrically with respect to the central point of the sandwiching portion 21.

Figure 5:
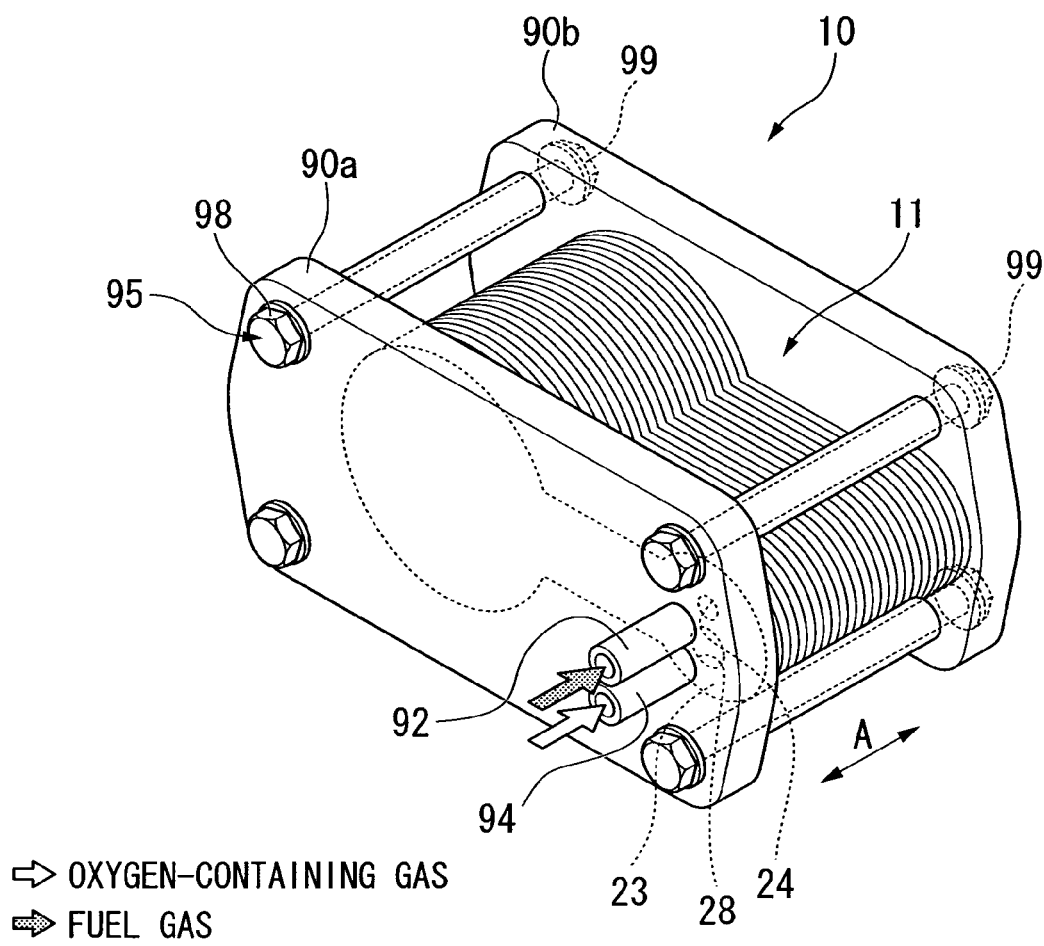
FIG. 5 is a perspective view schematically illustrating a fuel cell stack according to a second embodiment of the invention.

FIG. 5 is a perspective view schematically illustrating a fuel cell stack 10 according to this embodiment. The fuel cells 11 are stacked in the direction of arrow A to form the fuel cell stack 10. The fuel cell stack 10 is sandwiched between the end plates 90a and 90b by the fastening member 95, and the stacking load (clamp load) is provided to the fuel cells 11.

The first pipe 92 supplying the fuel gas and the second pipe 94 supplying the oxygen-containing gas to the fuel cells stack 10 are provided at one of the end plates, for example the end plate 90a. In the second embodiment, since the fuel gas supply passage 24 and the oxygen-containing gas supply passage 28 are formed in parallel in one reactant gas supply portion 23, the first pipe 92 and the second pipe 94 are also located in parallel.

[Operations]

Operations of the fuel cell according to the second embodiment will be described below.

The fuel gas is supplied to the anode electrode 14 via the first pipe 92 shown in FIG. 5, the fuel gas supply passage 24, the fuel gas supply channel 34, the fuel gas inlet 42, and the fuel gas channel 41 shown in FIG. 6, and is used for generating power. The fuel gas used for generating power is discharged to the outside of the anode electrode 14 from the fuel gas outlets 45 formed in the first circumferential protrusion 44.

The oxygen-containing gas is supplied to the cathode electrode 15 via the second pipe 94 shown in FIG. 5, the oxygen-containing gas supply passage 28, the oxygen-containing gas supply channel 35, the oxygen-containing gas inlet 52, and the oxygen-containing gas channel 51 shown in FIG. 6, and is used for generating power. The oxygen-containing gas used for generating power is discharged to the outside of the cathode electrode 15 from the oxygen-containing gas outlets 55 formed in the second circumferential protrusion 54.

The same advantages as the first embodiment can be obtained in the fuel cell according to this embodiment.

In the second embodiment, the reactant gas supply portion 23 is connected to the sandwiching portion 21 by the reactant gas bridge 22.

Accordingly, since the stacking load in the stacking direction is intercepted between the reactant gas supply portion 23 and the sandwiching portion 21 by the reactant gas bridge 22, it is possible to apply a desired load to the electrolyte electrode assembly 12. Therefore, with a simple and compact configuration, it is possible to apply a relatively-great load to the reactant gas supply portion 23 which requiring sealing ability, while a relatively-small load to improve the adhesiveness with the sandwiching portion 21 is applied to the electrolyte electrode assembly 12. Accordingly, it is possible to secure predetermined sealing ability in the reactant gas supply portion 23, and to prevent the damage of the electrolyte electrode assembly 12 as much as possible, thereby efficient generation and collection of power can be performed.

In addition, the fuel gas supply channel 34 and the oxygen-containing gas supply channel 35 are formed in the reactant gas bridge 22. Accordingly, before the fuel gas and the oxygen-containing gas are supplied to the electrolyte electrode assembly 12, the temperature difference between the fuel gas and the oxygen-containing gas are decreased, thereby the electrolyte electrode assembly 12 can stably generate power.

The fuel gas supply passage 24 and the oxygen-containing gas supply passage 28 are formed in the reactant gas supply portion 23. Accordingly, before the fuel gas and the oxygen-containing gas are supplied to the electrolyte electrode assembly 12, the temperature difference between the fuel gas and the oxygen-containing gas are decreases, thereby the electrolyte electrode assembly 12 can stably generate power.

The fuel gas supply passage 24 and the oxygen-containing gas supply passage 28 which require the sealing ability are concentrated on the reactant gas supply portion 23. Accordingly, it is possible to secure predetermined sealing ability of the reactant gas supply portion 23, and to suppress the damage of the electrolyte electrode assembly 12 as much as possible, thereby the efficient power generation and power collection can be performed.

In this embodiment, the summation of sectional area of the fuel gas supply channel 34 is set to be smaller than the summation of sectional area of the oxygen-containing gas supply channel 35.

The summation of sectional area of the fuel gas supply passage 24 is set to be smaller than the summation of sectional area of the oxygen-containing gas supply passage 28.

Generally, in a fuel cell operating at an air-fuel ratio (A/F) >1.0, a pressure difference and a pressure loss difference between the fuel gas and the oxygen-containing gas are reduced according to this configuration of the embodiment. Accordingly, other gas such as oxygen-containing gas or exhaust gas can be further prevented from flowing into the anode electrode 14 from the outside of the electrolyte electrode assembly 12, and other gas such as fuel gas or exhaust gas can be further prevented from flowing into the cathode electrode 15 from the outside of the electrolyte electrode assembly 12. Accordingly, it is possible to easily improve the durability of the separator 20 and the electrolyte electrode assembly 12.

Third Embodiment

A fuel cell according to a third embodiment of the invention will be described below. In the first embodiment shown in FIG. 3 and the second embodiment shown in FIG. 6, one sandwiching portion 21 is disposed in one separator 20. However, in the third embodiment shown in FIG. 8, two sandwiching portions 21a and 21b are disposed in one separator 20. The same elements as described in the first and second embodiments will not be described in detail.

Figure 8:
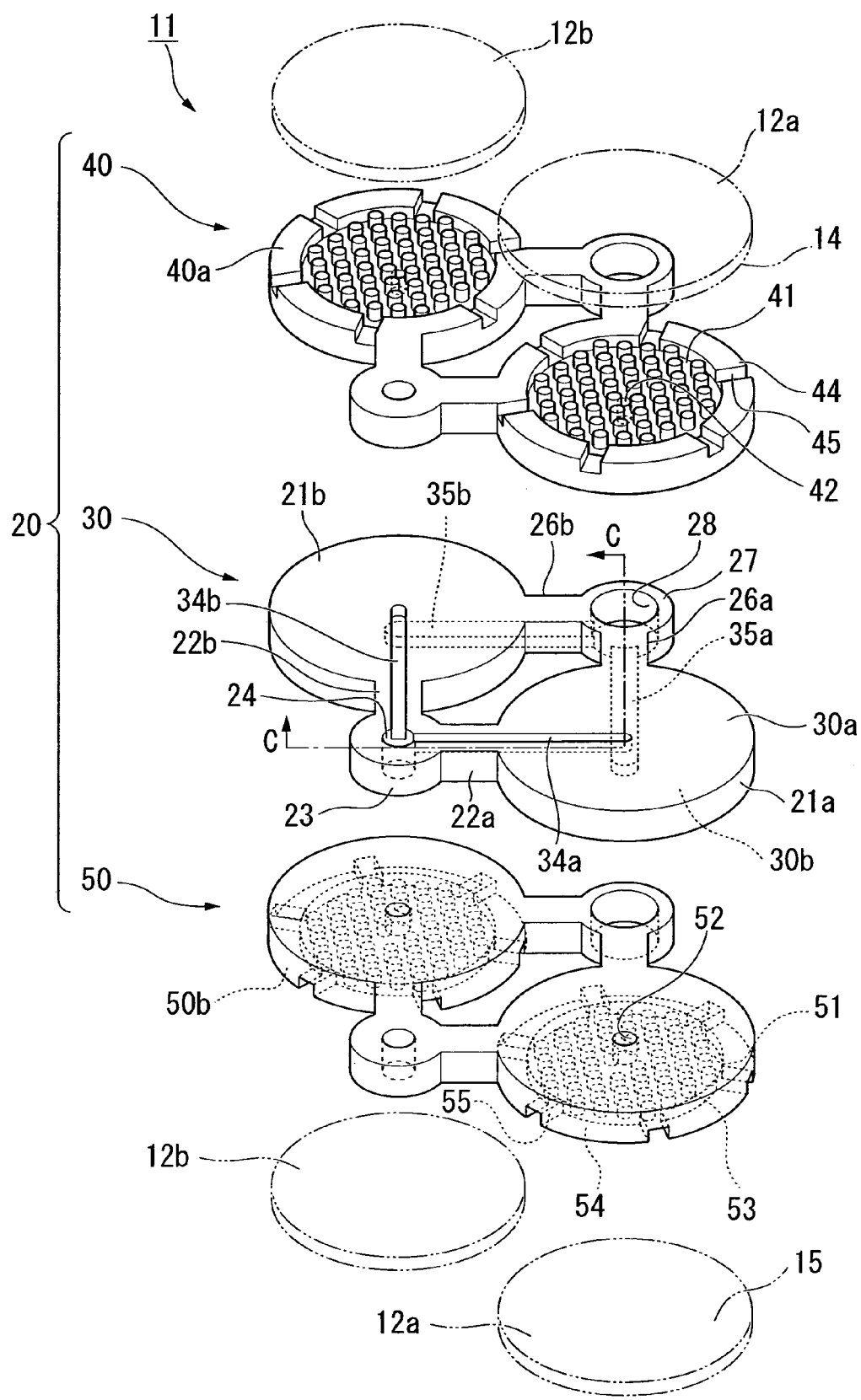
FIG. 8 is an exploded perspective view of a fuel cell according to a third embodiment of the invention.

FIG. 8 is an exploded perspective view of a fuel cell 11 according to the third embodiment of the invention. The sectional view taken along line C-C of FIG. 8 is almost equal to FIG. 2B. As shown in FIG. 8, the separator 20 of the fuel cell 11 includes two sandwiching portions 21a and 21b which sandwich adjacent two electrolyte electrode assemblies 12a and 12b. A fuel gas supply portion 23 having a fuel gas supply passage 24 and an oxygen-containing gas supply portion 27 having an oxygen-containing gas supply passage 28 are provided at both sides of a straight line connecting the centers of the first sandwiching portion 21a and the second sandwiching portion 21. The fuel gas supply portion 23 is connected to the first sandwiching portion 21a by a first fuel gas bridge 22a, and is connected to the second sandwiching portion 21b by a second fuel gas bridge 22b. The oxygen-containing gas supply portion 27 is connected to the first sandwiching portion 21a by a first oxygen-containing gas bridge 26a, and is connected to the second sandwiching portion 21b by a second oxygen-containing gas bridge 26b.

The separator 20 includes a first plate 40, a second plate 50, and a third plate 30 which are stacked. On the first surface 30a of the third plate 30 (front surface; that is, the surface facing the first plate 40), a first fuel gas supply channel 34a is formed from the fuel gas supply passage 24 to the center of the first sandwiching portion 21a through the first fuel gas bridge 22a, and a second fuel gas supply channel 34b is formed from the fuel gas supply passage 24 to the center of the first sandwiching portion 21a through the second fuel gas bridge 22b. On the other hand, on the second surface 30b of the third plate 30 (rear surface; that is, the surface facing the second plate 50), a first oxygen-containing gas supply channel 35a is formed from the oxygen-containing gas supply passage 28 to the center of the first sandwiching portion 21a through the first oxygen-containing gas bridge 26a, and a second oxygen-containing gas supply channel 35b is formed from the oxygen-containing gas supply passage 28 to the center of the second sandwiching portion 21b through the second oxygen-containing gas bridge 26b.

Fuel gas passages 41 are formed in the first surfaces 40a of the sandwiching portions 21a and 21b in the first plate 40. Fuel gas inlets 42 communicating with the fuel gas supply channels 34a and 34b of the third plate 30 are formed in the vicinity of the center of the fuel gas channels 41. Plural projections 43 are formed inside the fuel gas channels 41 and first circumferential protrusions 44 are formed around the fuel gas channels 41. In the first circumferential protrusions 44, plural fuel gas outlets 45 are formed in a radial pattern so as to be separated from each other in the circumferential direction of the first circumferential protrusions 44.

Oxygen-containing gas passages 51 are formed in the second surfaces 50b of the sandwiching portions 21a and 21b in the second plate 50. Oxygen-containing gas inlets 52 communicating with the oxygen-containing gas supply channels 35a and 35b of the third plate 30 are formed in the vicinity of the center of the oxygen-containing gas channels 51. Plural projections 53 are formed inside the oxygen-containing gas channels 51 and second circumferential protrusions 54 are formed around the oxygen-containing gas channels 51. In the second circumferential protrusions 54, plural oxygen-containing gas outlets 55 are formed in a radial pattern so as to be separated at an equal angle interval in the circumferential direction of the second circumferential protrusions 54.

Figure 9:
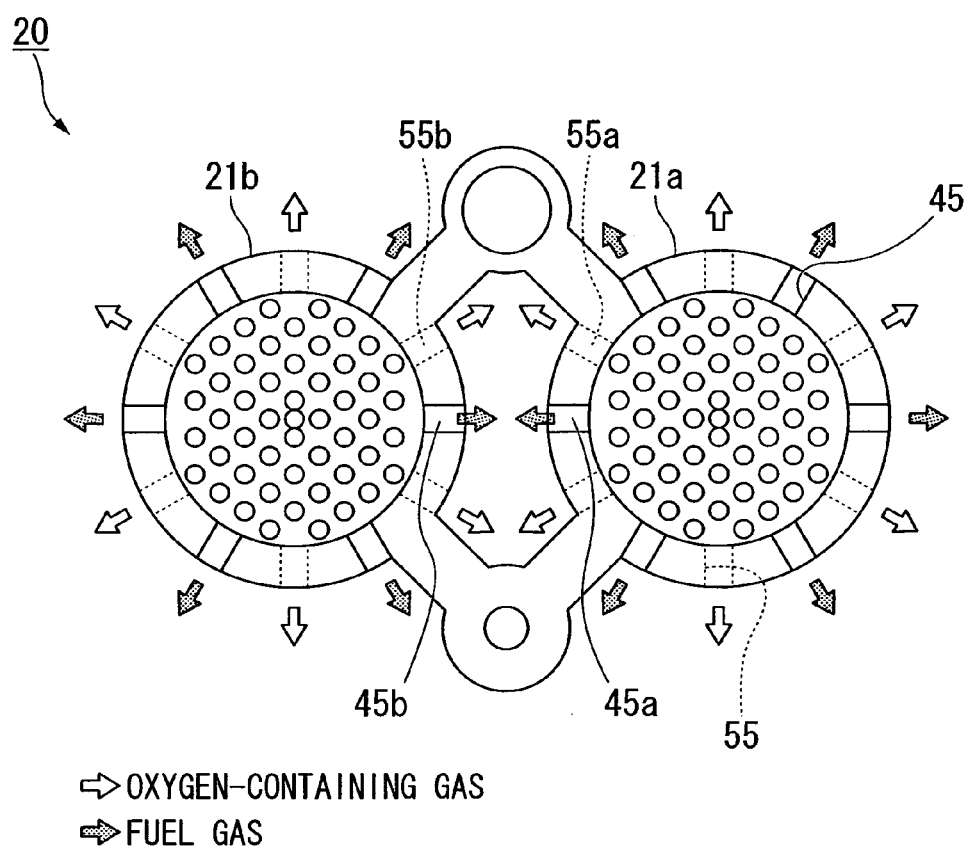
FIG. 9 is a plan view of a separator according to the third embodiment of the invention.

FIG. 9 is a bottom view of the separator 20. The fuel gas outlets 45 and the oxygen-containing gas outlets 55 are located at different positions (with different phases) in the circumferential direction of the sandwiching portions 21a and 21b. As shown in FIG. 9, in the area where the sandwiching portions 21a and 21b are adjacent, the fuel gas outlet 45a of the sandwiching portion 21a and the fuel gas outlet 45b of the sandwiching portion 21b are face to each other. That is, the discharge directions of the fuel gas outlet 45a and the oxygen-containing gas outlet 55b do not directly face to each other (the position thereof is shifted). That is, the discharge direction of the fuel gas outlets 45a intersects with the discharge direction of the oxygen-containing gas outlets 55b of the adjacent sandwiching portion. According to this disposition, it is possible to prevent the oxygen-containing gas flowing into the anode electrode and the fuel gas flowing into the cathode electrode. The position of the fuel gas outlets 45a and 45b can be shifted from each other, and the position of the oxygen-containing gas outlets 55a and 55b also can be shifted from each other. A roughly-quadrangle can be obtained by drawing a line sequentially thorough the central points of the sandwiching portion 21a, the oxygen-containing gas supply passage 28, the sandwiching portion 21b, and the fuel gas supply passage 24. The roughly-quadrangle formed by connecting the central points can be formed in various shapes such as regular tetragon, rectangle, or parallelogram, in accordance with the desired shape of the fuel cell stack.

[Operations]

Operations of the fuel cell according to the third embodiment will be described below.

The fuel gas is supplied to the anode electrodes 14 of the electrolyte electrode assemblies 12a and 12b from the fuel gas supply passage 24 shown in FIG. 8 via the fuel gas supply channels 34a and 34b and the fuel gas inlets 42 and the fuel gas channels 41 of the sandwiching portions 21a and 21b, and is used for generating power. The fuel gas used for generating power is discharged to the outside of the anode electrodes 14 from the fuel gas outlets 45 formed in the first circumferential protrusions 44.

The oxygen-containing gas is supplied to the cathode electrodes 15 of the electrolyte electrode assemblies 12a and 12b from the oxygen-containing gas supply passage 28 via the oxygen-containing gas supply channels 35a and 35b and the oxygen-containing gas inlets 52 and the oxygen-containing gas channels 51 of the sandwiching portions 21a and 21b, and is used for generating power. The oxygen-containing gas used for generating power is discharged to the outside of the cathode electrodes 15 from the oxygen-containing gas outlets 55 formed in the second circumferential protrusions 54.

In the fuel cell according to this embodiment, it is possible to obtain the same advantages as the first embodiment.

Generally, since the power of the fuel cell stack is proportional to the number of electrolyte electrode assemblies 12, the actual fuel cells stack requires a considerable number of electrolyte electrode assemblies 12. The fuel cell according to the third embodiment includes two sandwiching portions 21a and 21b in one separator 20 and two electrolyte electrode assemblies 12a and 12b which are sandwiched between the adjacent separators. Accordingly, it is possible to further reduce the size of the fuel cell stack, compared with the first embodiment.

In this embodiment, the fuel cell is a solid oxide fuel cell.

Accordingly, in the solid oxide fuel cell which is a high-temperature fuel cell, the thermal strain of the sandwiching portions 21a and 21b or the electrolyte electrode assemblies 12a and 12b due to heat stress, which is a problem in the related art, is not transmitted to the adjacent sandwiching portions or the adjacent electrolyte electrode assemblies. Accordingly, it is not necessary to provide an absorption mechanism with a particular size between the sandwiching portions 21a and 21b or between the electrolyte electrode assemblies 12a and 12b, thereby easily reducing the size of the fuel cell.

In the first to third embodiments, a line-shaped fuel gas supply channels and oxygen-containing gas channels are shown in figures. However, the embodiments do not limited by those, a curve-shaped fuel gas supply channels and oxygen-containing gas channels may be employed. In addition, a line-shaped fuel gas bridge and oxygen-containing gas bridge are shown in figures. However, they shape of the fuel gas bridge and oxygen-containing gas bridge may also employ a curve-shape or the like.

Fourth Embodiment

A fuel cell according to a fourth embodiment of the invention will be described below. In the first embodiment shown in FIG. 3, one sandwiching portion 21 is disposed in one separator 20. However, in the fourth embodiment shown in FIG. 10, four sandwiching portions 21a to 21d are disposed in one separator 20. The same elements as described in the first to third embodiments will not be described in detail.

Figure 10:
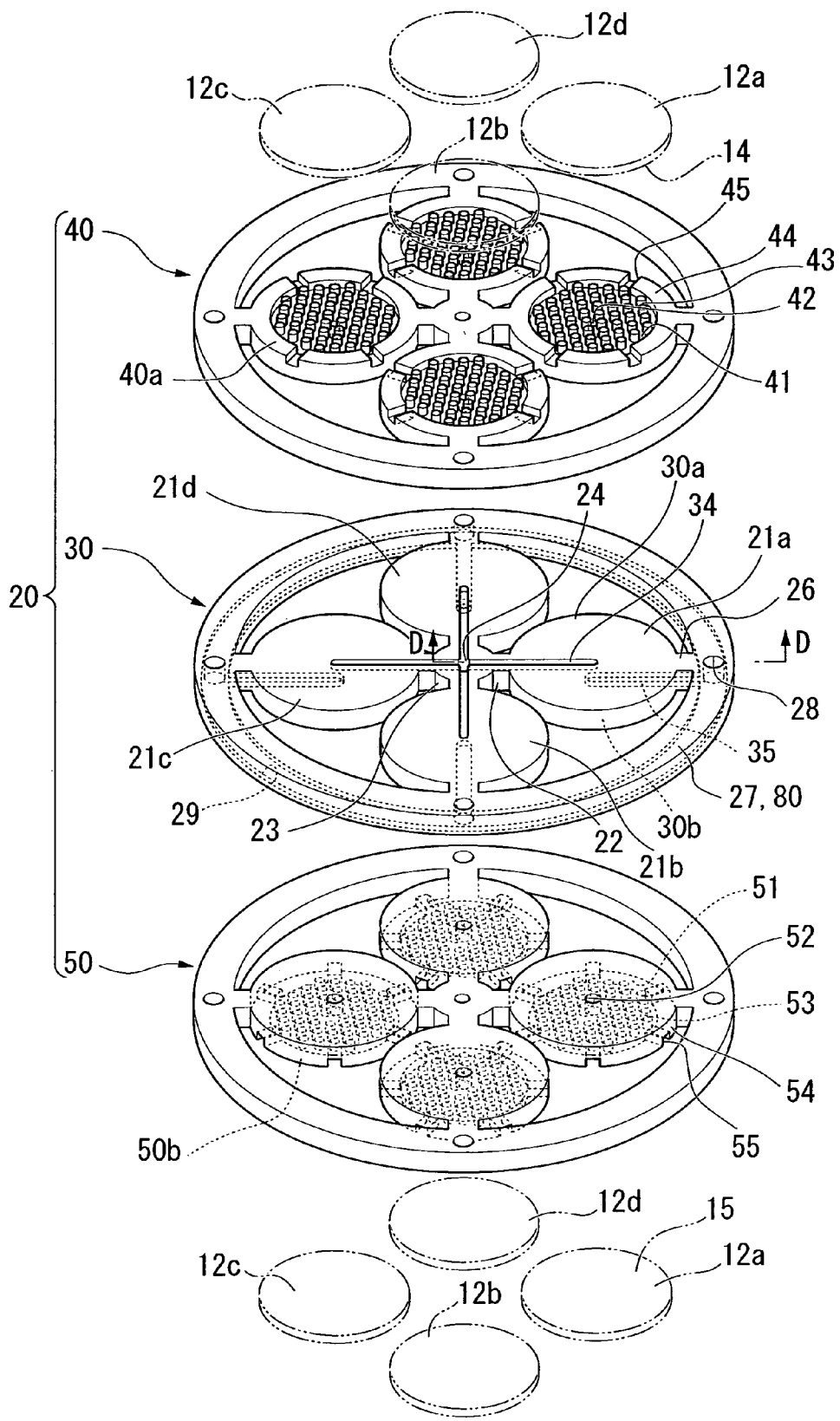
FIG. 10 is an exploded perspective view of a fuel cell according to a fourth embodiment of the invention.

FIG. 10 is an exploded perspective view of a fuel cell 11 according to the fourth embodiment of the invention. The sectional view taken along line D-D of FIG. 10 is almost equal to FIG. 2B. As shown in FIG. 10, the separator 20 of the fuel cell 11 includes four sandwiching portions 21a to 21d which sandwich four adjacent electrolyte electrode assemblies 12a to 12d. A fuel gas supply portion 23 having a fuel gas supply passage 24 is provided at the center of four sandwiching portions 21a to 12d. The fuel gas supply portion 23 is connected to the sandwiching portions 21a to 21d by fuel gas bridges 22 respectively. On the other hand, a ring-shape oxygen-containing gas supply portion 27 is formed around four sandwiching portions 21a to 21d. The oxygen-containing gas supply portion 27 is connected to the sandwiching portions 21a to 21d by oxygen-containing gas bridges 26, respectively. Plural oxygen-containing gas supply passages 28 are formed at an equal angle interval in the circumferential direction of the oxygen-containing gas supply portion 27.

When the oxygen-containing gas supply portions 27 are stacked with a sealing member interposed therebetween, the oxygen-containing gas supply portion 27 serve as a case 80 covering the fuel cell. When a bolt as fastening member is inserted into a fastening hole (not shown) formed in the case 80, it is possible to apply a stacking load to the case 80.

On the first surface 30a of the third plate 30, fuel gas supply channels 34 are formed from the fuel gas supply passage 24 to the centers of the sandwiching portions 21a to 21d via the fuel gas bridges 22. On the second surface 30b of the third plate 30 (the case 80), a filling chamber 29 communicating with the oxygen-containing gas supply passages 28 is formed as shown in the bottom view of FIG. 11. Specifically, the filling chamber 29 is formed by forming a ring-shape groove in the circumferential direction of the case 80. Oxygen-containing gas supply passages 35 are formed from the filling chamber 29 to the center of the sandwiching portions 21a to 21d via the oxygen-containing gas bridges 26.

Return to FIG. 10, the fuel gas channels 41 are formed on the first surface 40a of the sandwiching portions 21a to 21d in the first plate 40, respectively. Fuel gas inlets 42 communicating with the fuel gas supply channels 34 of the third plate 30 are formed in the vicinity of the centers of the fuel gas channels 41. Plural projections 43 are formed inside the fuel gas channels 41 and first circumferential protrusions 44 are formed around the fuel gas channels 41. In the first circumferential protrusions 44, plural fuel gas outlets 45 are formed in a radial pattern so as to be separated in the circumferential direction of the first circumferential protrusions 44.

The oxygen-containing gas channels 51 are formed on the second surface 50b of the sandwiching portions 21a and 21b in the second plate 50, respectively. Oxygen-containing gas inlets 52 communicating with the oxygen-containing gas supply channels 35 of the third plate 30 are formed in the vicinity of the centers of the oxygen-containing gas channels 51. Plural projections 53 are formed inside the oxygen-containing gas channels 51 and second circumferential protrusions 54 are formed around the oxygen-containing gas channels 51. In the second circumferential protrusions 54, plural oxygen-containing gas outlets 55 are formed in a radial pattern so as to be separated at an equal angle interval in the circumferential direction of the second circumferential protrusions 54.

Figure 11:
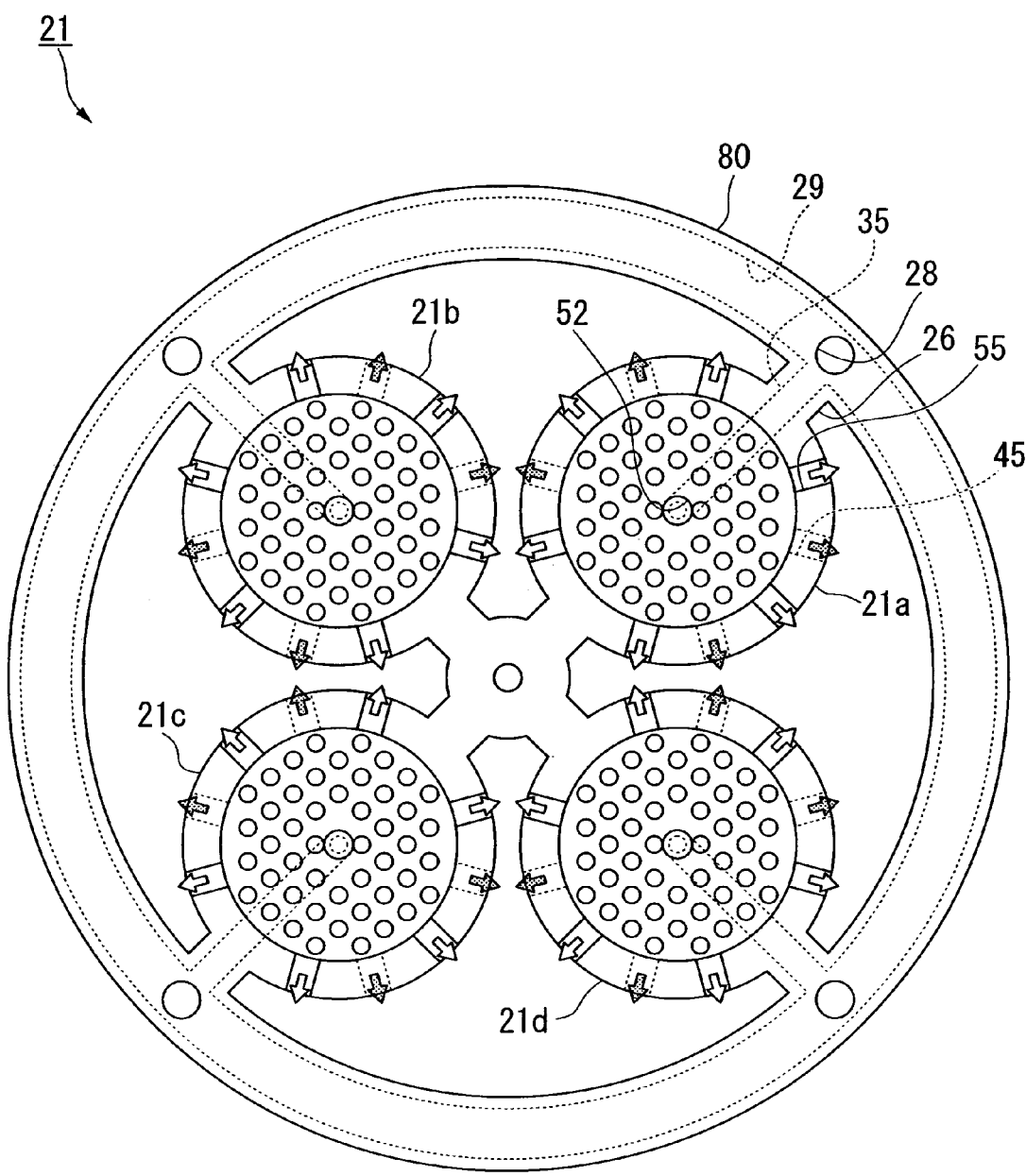
FIG. 11 is a plan view of a separator according to the fourth embodiment of the invention.

FIG. 11 is a bottom view of the separator 20. The fuel gas outlets 45 and the oxygen-containing gas outlets 55 are located at different positions (with different phases) in the circumferential direction of the sandwiching portions 21a to 21d. As described in the third embodiment, the fuel gas outlets 45 of adjacent sandwiching portions can be face to each other, and the oxygen-containing gas outlets 55 of adjacent sandwiching portions can be nearly face to each other. The discharge direction of the fuel gas outlets 45 intersects with the discharge direction of the oxygen-containing gas outlets 55 of the adjacent sandwiching portion.

[Operations]

Operations of the fuel cell according to the fourth embodiment will be described below.

The fuel gas is supplied to the anode electrodes 14 of the electrolyte electrode assemblies 12a to 12d from the fuel gas supply passage 24 shown in FIG. 10 via the fuel gas supply channels 34 and the fuel gas inlets 42 and the fuel gas channels 41 of the sandwiching portions 21a to 21d, and is used for generating power. The fuel gas used for generating power is discharged to the inner space of the case 80 from the fuel gas outlets 45 formed in the first circumferential protrusions 44.

The oxygen-containing gas is supplied to the cathode electrodes 15 of the electrolyte electrode assemblies 12a to 12d from the oxygen-containing gas supply passages 28 via the filling chamber 29, the oxygen-containing gas supply channels 35, and the oxygen-containing gas inlets 52 and the oxygen-containing gas channels 51 of the sandwiching portions 21a to 21d, and is used for generating power. The oxygen-containing gas used for generating power is discharged to the inner space of the case 80 from the oxygen-containing gas outlets 55 formed in the second circumferential protrusions 54.

In the fuel cell according to this embodiment, it is possible to obtain the same advantages as the first and third embodiments.

In this embodiment, the fuel gas supply portion 23 is disposed at the center of the separator 20, and plural electrolyte electrode assemblies 12a to 12d are arranged concentrically around the fuel gas supply portion 23. However, the embodiment does not limited by this, the plural electrolyte electrode assemblies 12a to 12d may be arranged elliptically around the fuel gas supply portion 23.

Since the fuel gas supply portion 23 is disposed at the center of the separator 20, the fuel gas supplied to the fuel cell can be satisfactorily heated by the heat that is generated from the power generation. Accordingly, the fuel cell can accomplish an improvement in heat efficiency and a promotion in thermally self-sustained. Here, the thermally self-sustained means that the operating temperature of the fuel cell can be maintained only by self-generated heat without adding heat from the outside.

The plural electrolyte electrode assemblies 12a to 12d are arranged concentrically about the fuel gas supply portion 23, the fuel gas can be uniformly distributed to the electrolyte electrode assemblies 12a to 12d from the fuel gas supply portion 23. Thereby, improvement and stabilization in power generation performance of the electrolyte electrode assemblies 12a to 12d can be obtained.

In this embodiment, when plural fuel cells are stacked, the electrolyte electrode assemblies 12a to 12d arranged concentrically in the fuel cells may be arranged with the same phase in the stacking direction of the fuel cells. That is, the electrolyte electrode assemblies are located at the same positions as viewed in the stacking direction of the fuel cells.

Accordingly, since the load applied to the electrolyte electrode assemblies 12a to 12d is not insufficient, it is possible to improve the adhesiveness between the electrolyte electrode assemblies 12a to 12d and the separators 20, thereby the power generated from the electrolyte electrode assemblies 12a to 12d can be collected efficiently.

In this embodiment, the sandwiching portions 21a to 21d can have shapes corresponding to the electrolyte electrode assemblies 12a to 12d, respectively, and the sandwiching portions 21a to 21d can be separated from each other.

Since the sandwiching portions 21a to 21d have the shapes corresponding to the electrolyte electrode assemblies 12a to 12d, it is possible to efficiently collect the power generated from the electrolyte electrode assemblies 12a to 12d.

In addition, since the sandwiching portions 21a to 21d are separated from each other, the load in the stacking direction can be applied independently to the adjacent electrolyte electrode assemblies 12a to 12d. Accordingly, it is possible to absorb the load difference caused in the electrolyte electrode assemblies 12a to 12d due to the size difference between the electrolyte electrode assemblies 12a to 12d or the separators 20. Therefore, it is possible to prevent the strain (distortion) caused in the whole separators 20, and to apply uniform loads to the electrolyte electrode assemblies 12a to 12d. Since the thermal strain of the electrolyte electrode assemblies 12a to 12d is not transmitted to the adjacent electrolyte electrode assemblies, it is not necessary to provide an absorption mechanism with a particular size between the electrolyte electrode assemblies. Accordingly, it is possible to dispose the electrolyte electrode assemblies 12a to 12d to be close to each other. Thereby, a miniaturization of the entire fuel cell is easily accomplished.

In this embodiment, the fuel gas bridges 22 are arranged in a radial pattern so as to be separated from each other at an equal angle interval outward from the fuel gas supply portion 23.

Accordingly, the fuel gas can be uniformly supplied to the electrolyte electrode assemblies 12a to 12d from the fuel gas supply portion 23 via the fuel gas bridges 22. Thereby, the improvement and stabilization in power generation performance of the electrolyte electrode assemblies 12a to 12d can be accomplished.

In this embodiment, the numbers of the sandwiching portions 21a to 21d, the fuel gas bridges 22, and the oxygen-containing gas bridges 26 in the separators 20 are set to correspond to the number of the electrolyte electrode assemblies 12a to 12d.

According to this configuration, the fuel gas can be uniformly supplied to the electrolyte electrode assemblies 12a to 12d from the fuel gas supply portion 23 via the fuel gas bridges 22 and the sandwiching portions 21a to 21d. Thereby, the improvement and stabilization in power generation performance of the electrolyte electrode assemblies 12a to 12d can be accomplished.

In this embodiment, the fuel gas supply portion 23 is disposed at the center of separator 20, and plural electrolyte electrode assemblies 12a to 12d are arranged concentrically about the fuel gas supply portion 23.

Since the fuel gas supply portion 23 is disposed at the center of the separator 20, the fuel gas and the oxygen-containing gas supplied to the fuel cell can be satisfactorily heated by the heat which is generated from the power generation. Accordingly, the fuel cell can accomplish an improvement in heat efficiency and a promotion in thermally self-sustained. Here, the thermally self-sustained means that the operating temperature of the fuel cell can be maintained only by self-generated heat without adding heat from the outside.

In addition, four electrolyte electrode assemblies 12a to 12d are arranged concentrically within the plane of the separator 20. Accordingly, it is possible to obtain a high occupancy ratio in a fuel cell structure in which two or more electrolyte electrode assemblies with the same shape and the same area are arranged concentrically in the plane of the separator 20. In addition, a stack volume for each power generation become decrease, thereby the compactness of the whole fuel cell stack can be easily accomplished. On the other hand, since a stack surface area for each power generation becomes decrease, it is possible to minimize the heat dissipation from the fuel cell stack, thereby the improvement in heat efficiency and the promotion in thermally self-sustained can be accomplished.

In this embodiment, since the case 80 covering the fuel cell is disposed in the separator 20, a casing for storing the fuel cell is not necessary. Accordingly, it is possible to effectively reduce the number of components, and to improve the assembly operation. In addition, a fuel cell with a compact structure can be manufactured at a low cost.

The discharged gas from the fuel cell temporarily stays in the inner space of case 80. Accordingly, the case 80 works as a cover member preventing the discharged gas from the fuel cell from diffusing to the outside of the fuel cell, and also works as a heat insulating member preventing thermal energy from diffusing. Accordingly, it is possible to enhance the heat retaining property of the fuel cell or the heat efficiency by recovering the discharged heat. The heat insulating structure can be simplified, and which is also economical.

In this embodiment, the case 80 includes the filling chamber 29 filled with the oxygen-containing gas supplied from the oxygen-containing gas supply passage 28. Since the oxygen-containing gas filled in the filling chamber 29 is heated by the discharged gas from the fuel cell, the oxygen-containing gas can be pre-heated before it is supplied to the electrolyte electrode assembly 12. Therefore, it is possible to promote the thermal independent operation of the whole fuel cell 11 and to efficiently utilize the thermal energy. Since the case 80 and the filling chamber 29 are formed in a ring shape, the oxygen-containing gas in the filling chamber 29 can be uniformly heated.

Fifth Embodiment

A fuel cell according to a fifth embodiment of the invention will be described below. In the second embodiment shown in FIG. 6, one sandwiching portion 21 is disposed in one separator 20. However, in the fifth embodiment shown in FIG. 12, four sandwiching portions 21a to 21d are disposed in one separator 20. The same elements as described in the first to fourth embodiments will not be described in detail.

Figure 12:
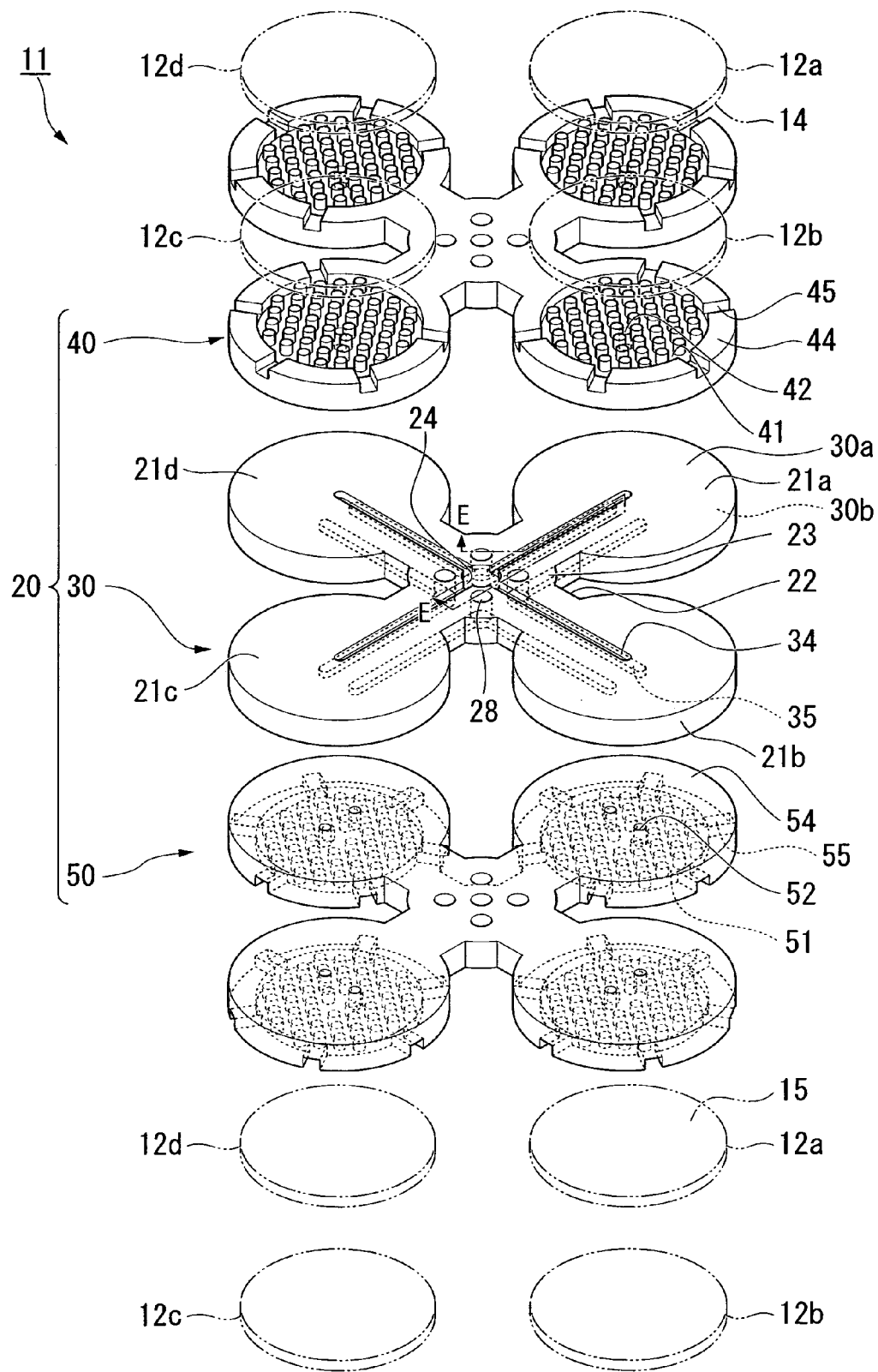
FIG. 12 is an exploded perspective view of a fuel cell according to a fifth embodiment of the invention.

FIG. 12 is an exploded perspective view of a fuel cell 11 according to the fifth embodiment of the invention. The sectional view taken along line E-E of FIG. 12 is almost equal to FIG. 2B. As shown in FIG. 12, the separator 20 of the fuel cell 11 includes four sandwiching portions 21a to 21d which sandwich adjacent four electrolyte electrode assemblies 12a to 12d. A single reactant gas supply portion 23 is disposed at the center of four sandwiching portions 21a to 21d. The reactant gas supply portion 23 is connected to the sandwiching portions 21a to 21d by reactant gas bridges 22.

A fuel gas supply passage 24 is formed at the center of the reactant gas supply portion 23. Plural oxygen-containing gas supply passages 28 are formed in the shame circumference centered on the fuel gas supply passage 24. The oxygen-containing gas supply passages 28 are disposed between the adjacent reactant gas bridges 22.

On the first surface 30a of the third plate 30, fuel gas supply channels 34 are formed from the fuel gas supply passage 24 to the centers of the sandwiching portions 21a to 21d via the reactant gas bridges 22. On the second surface 30b of the third plate 30, as shown in the bottom view of FIG. 13, oxygen-containing gas supply channels 35 are formed from the oxygen-containing gas supply passages 28 to the centers of the sandwiching portions 21a to 21d via the adjacent reactant gas bridges 22. Two oxygen-containing gas supply channels 35 are formed in parallel with the fuel gas supply channel 34 interposed therebetween in each reactant gas bridge 22. Since two oxygen-containing gas supply channels 35 are made to communicate with the oxygen-containing gas channels 51, two oxygen-containing gas inlets 52 are formed in the respective sandwiching portions 21a to 21d.

Figure 13:
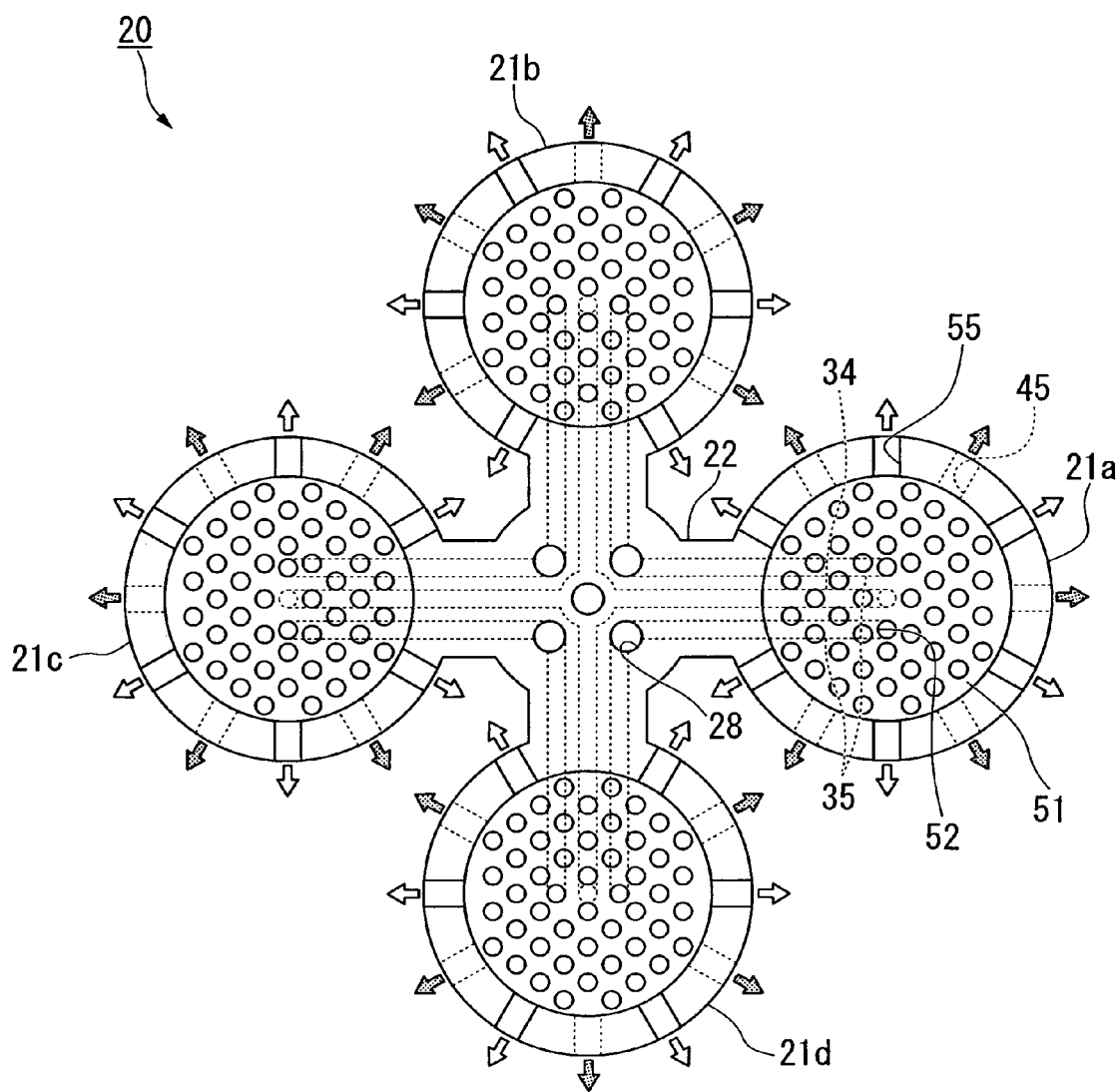
FIG. 13 is a plan view of a separator according to the fifth embodiment of the invention.

FIG. 13 is a bottom view of the separator 20. The fuel gas outlets 45 and the oxygen-containing gas outlets 55 are located at different positions (with different phases) in the circumferential direction of the sandwiching portions 21a to 21d.

[Operations]

Operations of the fuel cell according to the fifth embodiment will be described below.

The fuel gas is supplied to the anode electrodes 14 of the electrolyte electrode assemblies 12a to 12d from the fuel gas supply passage 24 shown in FIG. 12 via the fuel gas supply channels 34 and the fuel gas inlets 42 and the fuel gas channels 41 of the sandwiching portions 21a to 21d, and is used for generating power. The fuel gas used for generating power is discharged to the outside of the anode electrodes 14 from the fuel gas outlets 45 formed in the first circumferential protrusions 44.

The oxygen-containing gas is supplied to the cathode electrodes 15 of the electrolyte electrode assemblies 12a to 12d from the oxygen-containing gas supply passages 28 via the oxygen-containing gas supply channels 35 and the oxygen-containing gas inlets 52 and the oxygen-containing gas channels 51 of the sandwiching portions 21a to 21d, and is used for generating power. The oxygen-containing gas used for generating power is discharged to the outside of the cathode electrodes 15 from the oxygen-containing gas outlets 55 formed in the second circumferential protrusions 54.

In the fuel cell according to this embodiment, it is possible to obtain the same advantages as the first to fourth embodiments.

In this embodiment, the reactant gas supply portion 23 is disposed at the center of separator 20, and plural electrolyte electrode assemblies 12a to 12d are arranged concentrically about the reactant gas supply portion 23.

Since the reactant gas supply portion 23 is disposed at the center of the separator, the fuel gas and the oxygen-containing gas before being supplied to the electrolyte electrode assemblies 12a to 12d are heated by the heat which is generated by the power generation. Thereby, the improvement in heat efficiency and the promotion in thermally self-sustained can be accomplished.

Since the plural electrolyte electrode assemblies 12a to 12d are arranged concentrically about the reactant gas supply portion 23, the fuel gas and the oxygen-containing gas can be uniformly distributed to the electrolyte electrode assemblies 12a to 12d. Thereby, the improvement and stabilization in power generation performance of the electrolyte electrode assemblies 12a to 12d can be accomplished.

In this embodiment, when plural fuel cells are stacked, the electrolyte electrode assemblies 12a to 12d arranged concentrically in the fuel cells may be arranged with the same phase in the stacking direction of the fuel cells. That is, the electrolyte electrode assemblies are located at the same positions as viewed in the stacking direction of the fuel cells.

Accordingly, since the load applied to the electrolyte electrode assemblies 12a to 12d is not insufficient. Therefore, it is possible to improve the adhesiveness between the electrolyte electrode assemblies 12a to 12d and the separators 20, and to efficiently collect the power generated from the electrolyte electrode assemblies 12a to 12d.

In this embodiment, the sandwiching portions 21a to 21d have shapes corresponding to the electrolyte electrode assemblies 12a to 12d, respectively, and the sandwiching portions 21a to 21d are separated from each other.

Since the sandwiching portions 21a to 21d have the shapes corresponding to the electrolyte electrode assemblies 12a to 12d, it is possible to efficiently collect the power generated from the electrolyte electrode assemblies 12a to 12d.

In addition, since the sandwiching portions 21a to 21d are separated from each other, the load in the stacking direction can be applied independently to the adjacent electrolyte electrode assemblies 12a to 12d. Accordingly, it is possible to absorb the load difference caused in the electrolyte electrode assemblies 12a to 12d due to the size difference between the electrolyte electrode assemblies 12a to 12d or the separators 20. Therefore, it is possible to prevent the strain caused in the whole separator and to apply uniform loads to the electrolyte electrode assemblies 12a to 12d. Since the thermal strain of the electrolyte electrode assemblies 12a to 12d is not transmitted to the adjacent electrolyte electrode assemblies, it is not necessary to provide an absorption mechanism with a particular size between the electrolyte electrode assemblies. Accordingly, it is possible to dispose the electrolyte electrode assemblies 12a to 12d to be close to each other, and the miniaturization of the entire fuel cell can be easily accomplished.

In this embodiment, the reactant gas bridges 22 are arranged in a radial pattern so as to be separated from each other at an equal angle interval outward from the reactant gas supply portion 23.

Accordingly, the fuel gas and the oxygen-containing gas can be uniformly supplied to the electrolyte electrode assemblies 12a to 12d from the reactant gas supply portion 23 via the reactant gas bridges 22. Thereby, the improvement and stabilization in power generation performance of the electrolyte electrode assemblies 12a to 12d can be accomplished.

In this embodiment, the numbers of the sandwiching portions 21a to 21d and the reactant gas bridges 22 in the separators 20 are set to correspond to the number of the electrolyte electrode assemblies 12a to 12d.

According to this configuration, the fuel gas and the oxygen-containing gas can be uniformly supplied to the electrolyte electrode assemblies 12a to 12d from the fuel gas supply portion 23 via the reactant gas bridges 22 and the sandwiching portions 21a to 21d. Thereby, the improvement and stabilization in power generation performance of the electrolyte electrode assemblies 12a to 12d can be accomplished.

In this embodiment, the fuel gas supply passage 24 is disposed at the center of the reactant gas supply portion 23, and a plurality of the oxygen-containing gas inlets 28 are arranged concentrically about the fuel gas supply passage 24.

Accordingly, before the fuel gas and the oxygen-containing gas are supplied to the electrolyte electrode assemblies 12a to 12d, the temperature difference between the fuel gas and the oxygen-containing gas can decrease, thereby the electrolyte electrode assemblies 12a to 12d can stably generate power. In addition, since the whole sectional area of the flow passage of the oxygen-containing gas supply passages 28 is set to be greater than the whole sectional area of the flow passage of the fuel gas supply passage 24, it is possible to reduce the difference in pressure loss between the fuel gas and the oxygen-containing gas particularly in a fuel cell with a large A/F value. Accordingly, it is possible to satisfactorily improve the durability and the reliability of the fuel cell.

In this embodiment, the oxygen-containing gas supply passages 28 are interposed between the plural reactant gas bridges 22.

Accordingly, it is possible to construct a fuel cell with a further simple and compact structure.

In this embodiment, the number of the oxygen-containing gas supply passages 28 in the separators 20 may be set to correspond to the number of the electrolyte electrode assemblies 12a to 12d.

Accordingly, the oxygen-containing gas can be uniformly supplied to the electrolyte electrode assemblies 12a to 12d from the oxygen-containing gas supply passages 28 via the reactant gas bridges 22 and the sandwiching portions 21a to 21d. Thereby, the improvement and stabilization in power generation performance of the electrolyte electrode assemblies 12a to 12d can be accomplished.

In this embodiment, the reactant gas supply portion 23 is disposed at the center of separator 20, and the electrolyte electrode assemblies 12a to 12d are arranged concentrically about the reactant gas supply portion 23.

Since the reactant gas supply portion 23 is disposed at the center of the separator 20, the fuel gas and the oxygen-containing gas supplied to the fuel cell can be satisfactorily heated by the heat which is generated from the power generation. Accordingly, the fuel cell can accomplish an improvement in heat efficiency and a promotion in thermally self-sustained. Here, the thermally self-sustained means that the operating temperature of the fuel cell can be maintained only by self-generated heat without adding heat from the outside.

In addition, four electrolyte electrode assemblies 12a to 12d are arranged concentrically in the plane of the separator 20. Accordingly, it is possible to obtain a high occupancy ratio in a fuel cell structure in which two or more electrolyte electrode assemblies with the same shape and the same area are arranged concentrically in the plane of the separator 20. In addition, a stack volume for each power generation decreases, thereby easily accomplishing the compactness of the whole fuel cell stack. On the other hand, since a stack surface area for each power generation decreases, it is possible to minimize the heat dissipation from the fuel cell stack, thereby the improvement in heat efficiency and the promotion in thermally self-sustained can be accomplished.

In the above embodiments, the sandwiching portion and the electrolyte electrode assembly are formed in a circular shape. However, the embodiments do not limited by those, the sandwiching portion and the electrolyte electrode assembly may be formed in a rectangle shape or the like.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description.

INDUSTRIAL APPLICABILITY

The fuel cell according to the present invention can suppress the useless discharge of unused reactant gas, and suppress the diffusion of oxygen-containing gas to the anode electrode and the diffusion of fuel gas to the cathode electrode, and can be applied in various applications for installation or vehicle-mounting.

DESCRIPTION OF REFERENCE NUMERALS

10: FUEL CELL STACK
11: FUEL CELL
12, 12a, 12b, 12c, 12d: ELECTROLYTE ELECTRODE ASSEMBLY
13: ELECTROLYTE
14: ANODE ELECTRODE
15: CATHODE ELECTRODE
20: SEPARATOR
21, 21a, 21b, 21c, 21d: SANDWICHING PORTION
22: REACTANT GAS BRIDGE, FUEL GAS BRIDGE
23: REACTANT GAS SUPPLY PORTION, FUEL GAS SUPPLY PORTION
24: FUEL GAS SUPPLY PASSAGE
26: OXYGEN-CONTAINING GAS BRIDGE
27: OXYGEN-CONTAINING GAS SUPPLY PORTION
28: OXYGEN-CONTAINING GAS SUPPLY PASSAGE
30: THIRD PLATE
34: FUEL GAS SUPPLY CHANNEL
35: OXYGEN-CONTAINING GAS SUPPLY CHANNEL
40: FIRST PLATE
41: FUEL GAS CHANNEL
42: FUEL GAS INLET
43: PROJECTION
44: FIRST CIRCUMFERENTIAL PROTRUSION
45: FUEL GAS OUTLET
50: SECOND PLATE
51: OXYGEN-CONTAINING GAS CHANNEL
52: OXYGEN-CONTAINING GAS INLET
53: PROJECTION
54: SECOND CIRCUMFERENTIAL PROTRUSION
55: OXYGEN-CONTAINING GAS OUTLET

The invention claimed is:

1. A fuel cell comprising:
an electrolyte electrode assembly which includes an anode electrode, a cathode electrode, and an electrolyte which is sandwiched between the anode electrode and the cathode electrode;
a separator which includes a sandwiching portion that sandwiches the electrolyte electrode assembly;
a fuel gas channel which is formed at a first surface of the sandwiching portion, and is covered by the anode electrode;
fuel gas outlets which are formed outside the fuel gas channel in a radial direction of the fuel gas channel so that the fuel gas channel communicates with the outside of the fuel cell, and discharge a fuel gas inside the fuel gas channel to outside of the fuel gas channel;
an oxygen-containing gas channel which is formed at a second surface of the sandwiching portion, and is covered by the cathode electrode; and
oxygen-containing gas outlets which are formed outside the oxygen-containing gas channel in a radial direction of the oxygen-containing gas channel so that the oxygen-containing gas channel communicates with the outside of the fuel cell, and discharge an oxygen-containing gas inside the oxygen-containing gas channel to outside of the oxygen-containing gas channel, in which the oxygen-containing gas outlets are formed at phases different from phases of the fuel gas outlets in a circumferential direction of the sandwiching portion.

2. The fuel cell according to claim 1, wherein
the oxygen-containing gas outlets and the fuel gas outlets are formed at different phases in a thickness direction of the separator.

3. The fuel cell according to claim 1, wherein
a fuel gas inlet which is communicated with the fuel gas channel and an oxygen-containing gas inlet which is communicated with the oxygen-containing gas channel are formed at the sandwiching portion.

4. The fuel cell according to claim 1, wherein
a first circumferential protrusion which protrudes toward the fuel gas channel to contact with a circumferential portion of the anode electrode, is formed at the first surface of the sandwiching portion;
a second circumferential protrusion which protrudes toward the oxygen-containing gas channel to contact with a circumferential portion of the cathode electrode, is formed at the second surface of the sandwiching portion;
the fuel gas outlets are formed at the first circumferential protrusion; and
the oxygen-containing gas outlets are formed at the second circumferential protrusion.

5. The fuel cell according to claim 1, wherein
a summation of opening sectional areas of the fuel gas outlets is smaller than a summation of opening sectional areas of the oxygen-containing gas outlets.

6. The fuel cell according to claim 1, wherein
a number of the fuel gas outlets is smaller than a number of the oxygen-containing gas outlets.

7. The fuel cell according to claim 1, wherein
the fuel gas outlets are arranged in a radial pattern so as to be separated from each other at an equal angle interval in an in-plane direction of the separator from a center of the sandwiching portion.

8. The fuel cell according to claim 1, wherein
the oxygen-containing gas outlets are arranged in a radial pattern so as to be separated from each other at an equal angle interval in an in-plane direction of the separator from a center of the sandwiching portion.

9. The fuel cell according to claim 3, wherein
a summation of opening sectional area of the fuel gas inlet is smaller than a summation of opening sectional area of the oxygen-containing gas inlet.

10. The fuel cell according to claim 3, wherein
a number of the fuel gas inlet is smaller than a number of the oxygen-containing gas inlet.

11. The fuel cell according to claim 1, wherein
a volume of the fuel gas channel is smaller than a volume of the oxygen-containing gas channel.

12. The fuel cell according to claim 1, wherein
a plurality of first projections contacted with the anode electrode are formed at the first surface of the sandwiching portion.

13. The fuel cell according to claim 1, wherein
a plurality of second projections contacted with the cathode electrode are formed at the second surface of the sandwiching portion.

14. The fuel cell according to claim 1, wherein
a plurality of first projections contacted with the anode electrode are formed at the first surface of the sandwiching portion;
a plurality of second projections contacted with the cathode electrode are formed at the second surface of the sandwiching portion; and
a number of the first projections and the second projections which are arranged at a same phase in the thickness direction of the separator is greater than a number of the first projections and the second projections which are arranged at difference phases in the thickness direction.

15. The fuel cell according to claim 1, further comprising:
a fuel gas bridge which is connected to the sandwiching portion, in which a fuel gas supply channel supplying the fuel gas to the fuel gas channel is formed;
an oxygen-containing gas bridge which is connected to the sandwiching portion, in which an oxygen-containing gas supply channel supplying the oxygen-containing gas to the oxygen-containing gas channel is formed;
a fuel gas supply portion which is connected to the fuel gas bridge, in which a fuel gas supply passage supplying the fuel gas to the fuel gas supply channel is formed in the thickness direction; and
an oxygen-containing gas supply portion which is connected to the oxygen-containing gas bridge, in which an oxygen-containing gas supply passage supplying the oxygen-containing gas to the oxygen-containing gas supply channel is formed in the thickness direction.

16. The fuel cell according to claim 15, wherein
a summation of sectional area of the fuel gas supply channel is smaller than a summation of sectional area of the oxygen-containing gas supply channel.

17. The fuel cell according to claim 15, wherein
a summation of sectional area of the fuel gas supply passage is smaller than a summation of sectional area of the oxygen-containing gas supply passage.

18. The fuel cell according to claim 15, wherein
the fuel gas supply portion is formed at a center of the separator; and
a plurality of the electrolyte electrode assemblies are arranged concentrically or elliptically around the fuel gas supply portion.

19. The fuel cell according to claim 18, wherein
the plurality of the electrolyte electrode assemblies arranged concentrically or elliptically in the fuel cells are arranged at a same phase in a stacking direction of the fuel cells while a plurality of the fuel cells are stacked.

20. The fuel cell according to claim 18, wherein
a plurality of the sandwiching portions corresponding to a shape of the electrolyte electrode assemblies are arranged; and
the sandwiching portions are separated from each other.

21. The fuel cell according to claim 18, wherein
a plurality of the fuel gas bridges corresponding to the electrolyte electrode assemblies are arranged; and
the fuel gas bridges are arranged in a radial pattern so as to be separated from each other at an equal angle interval outward from the fuel gas supply portion.

22. The fuel cell according to claim 18, wherein
a number of the sandwiching portions, the fuel gas bridges, and the oxygen-containing gas bridges correspond to a number of the electrolyte electrode assemblies, respectively.

23. The fuel cell according to claim 1, further comprising:
a bridge which is connected to the sandwiching portion, in which a fuel gas supply channel supplying the fuel gas to the fuel gas channel and an oxygen-containing gas supply channel supplying the oxygen-containing gas to the oxygen-containing gas channel are formed; and
a reactant gas supply portion which is connected to the bridge, in which a fuel gas supply passage supplying the fuel gas to the fuel gas supply channel and an oxygen-containing gas supply passage supplying the oxygen-containing gas to the oxygen-containing gas supply channel are formed in the thickness direction.

24. The fuel cell according to claim 23, wherein
a summation of sectional area of the fuel gas supply channel is smaller than a summation of sectional area of the oxygen-containing gas supply channel.

25. The fuel cell according to claim 23, wherein
a summation of sectional area of the fuel gas supply passage is smaller than a summation of sectional area of the oxygen-containing gas supply passage.

26. The fuel cell according to claim 23, wherein
the reactant gas supply portion is formed at a center of the separator; and
a plurality of the electrolyte electrode assemblies are arranged concentrically or elliptically around the reactant gas supply portion.

27. The fuel cell according to claim 26, wherein
the electrolyte electrode assemblies arranged concentrically or elliptically in the fuel cells are arranged at a same phase in a stacking direction of the fuel cells while a plurality of the fuel cells are stacked.

28. The fuel cell according to claim 26, wherein
a plurality of the sandwiching portions corresponding to a shape of the electrolyte electrode assemblies are arranged; and
the sandwiching portions are separated from each other.

29. The fuel cell according to claim 26, wherein
a plurality of the bridges corresponding to the electrolyte electrode assemblies are arranged; and
the bridges are arranged in a radial pattern so as to be separated from each other at an equal angle interval outward from the reactant gas supply portion.

30. The fuel cell according to claim 23, wherein
a number of the sandwiching portions and the bridges corresponds to a number of the electrolyte electrode assemblies.

31. The fuel cell according to claim 23, wherein
the fuel gas supply passage is formed at a center of the reactant gas supply portion; and
a plurality of the oxygen-containing gas inlets are arranged concentrically or elliptically around the fuel gas supply passage.

32. The fuel cell according to claim 23, wherein
the oxygen-containing gas supply passages are interposed between a plurality of the bridges.

33. The fuel cell according to claim 23, wherein
a number of the oxygen-containing gas supply passages correspond to a number of the electrolyte electrode assemblies.

34. The fuel cell according to claim 15, wherein
the fuel gas supply portion or the reactant gas supply portion is formed at a center of the separator; and
four electrolyte electrode assemblies are arranged concentrically around the fuel gas supply portion or the reactant gas supply portion.

35. The fuel cell according to claim 1, wherein
the fuel cell is a solid oxide fuel cell.

* * * * *